(12) United States Patent
Pierce

(10) Patent No.: US 9,094,472 B2
(45) Date of Patent: Jul. 28, 2015

(54) WEB-BASED SERVICES FOR QUERYING AND MATCHING LIKES AND DISLIKES OF INDIVIDUALS

(71) Applicant: MyLykes, LLC, Canton, MA (US)

(72) Inventor: Michael Pierce, Canton, MA (US)

( * ) Notice: Subject to any disclaimer, the term of this patent is extended or adjusted under 35 U.S.C. 154(b) by 49 days.

(21) Appl. No.: 13/895,765

(22) Filed: May 16, 2013

(65) Prior Publication Data

US 2013/0254234 A1    Sep. 26, 2013

Related U.S. Application Data

(63) Continuation of application No. 12/198,570, filed on Aug. 26, 2008, now Pat. No. 8,458,153.

(51) Int. Cl.
| | |
|---|---|
| *G06F 7/00* | (2006.01) |
| *G06F 17/30* | (2006.01) |
| *H04L 29/08* | (2006.01) |
| *G06Q 30/02* | (2012.01) |

(52) U.S. Cl.
CPC ........ *H04L 67/306* (2013.01); *G06F 17/30699* (2013.01); *G06F 17/30702* (2013.01); *G06F 17/30867* (2013.01); *G06Q 30/02* (2013.01)

(58) Field of Classification Search
None
See application file for complete search history.

(56) References Cited

U.S. PATENT DOCUMENTS

| 6,012,051 | A | 1/2000 | Sammon et al. | |
|---|---|---|---|---|
| 7,082,613 | B1 | 7/2006 | Mineyama | |
| 7,853,600 | B2 * | 12/2010 | Herz et al. | 707/749 |
| 8,135,618 | B1 * | 3/2012 | Friedlander | 705/14.46 |
| 8,516,523 | B2 * | 8/2013 | Kamen | 725/46 |
| 2002/0104087 | A1 * | 8/2002 | Schaffer et al. | 725/46 |
| 2004/0073918 | A1 | 4/2004 | Ferman et al. | |

OTHER PUBLICATIONS

US Notice of Allowance Dtd Feb. 4, 2013.
US Office Action Dtd Oct. 21, 2011.
US Office Action Dtd Feb. 17, 2011.
US Office Action Dtd Sep. 27, 2012.

* cited by examiner

*Primary Examiner* — Uyen Le
(74) *Attorney, Agent, or Firm* — Christopher J. McKenna; Foley & Lardner LLP

(57) ABSTRACT

A method for centrally providing a profile of a user's degree of preference for one or more items across categories in a plurality of domains of interest in a taxonomy of preferences is described. In one embodiment, the method includes identifying a user's degree of preference for an item from a plurality of indicators. The user's degree of preference for the item is associated with a category in a domain of interest and is stored in a profile of the user. In another embodiment, the profile identifies preferences of the user in a taxonomy of preferences across categories in a plurality of domains of interest.

20 Claims, 27 Drawing Sheets

My Friend's List

Use this page to add to and manage your friends list. To edit a particular friend's information, simply click on "Edit".

You can also edit the groups your friends are in. Groups are useful for setting limits on who can access what about your likes.

| Name | Group | Last Update | Action |
|---|---|---|---|
| Calvin Hobbes | Not in a group | Not a member | Message/Edit/Delete |
| Spongebob Squarepants | Work | Not a member | Message/Edit/Delete |

Home | Account Info | Logout

Search: [          ] Go

About Us | Copyright | Privacy

Hyperlinked buttons 315

Friends 375

Groups List

Use groups to protect your information. When granting someone access to your profile, you choose which group they should belong to. For each group, you choose which items they are allowed to see. For example, you can create a group called "Family" that may contain more items than a group called "Co-Workers". Each group has a unique access code that you share with those members to ensure privacy.

| Name | Access Code | Action |
|---|---|---|
| Public | | Edit/Delete |
| Work | WpcJiT | Edit/Delete |
| Buffalo Friends | b8cuGT | Edit/Delete |

Access Code 378

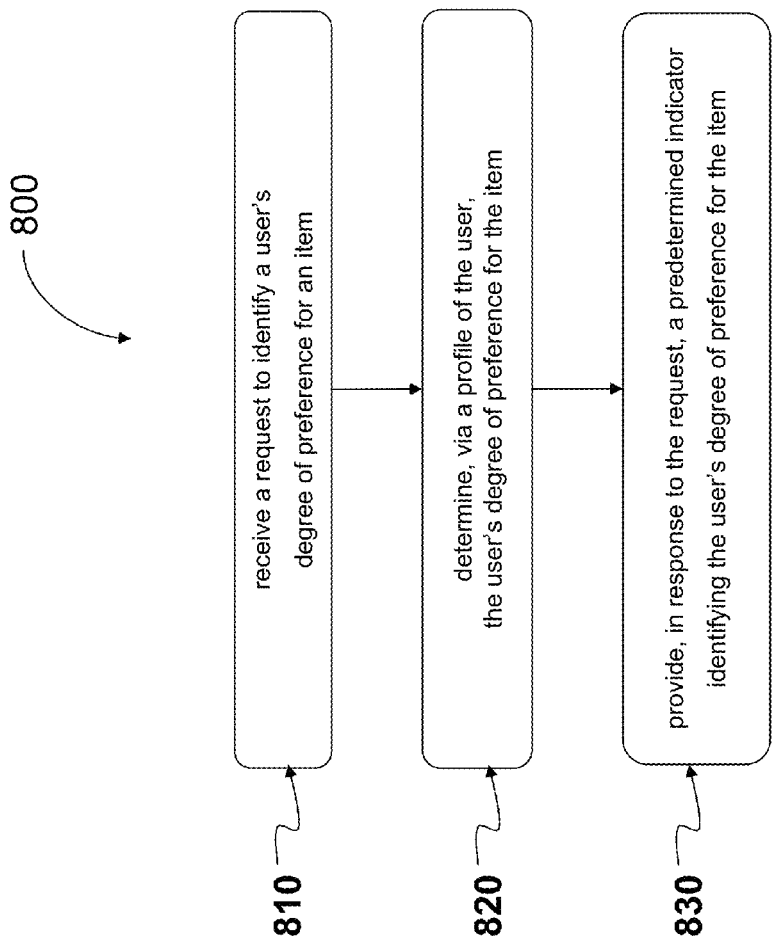

WEB-BASED SERVICES FOR QUERYING AND MATCHING LIKES AND DISLIKES OF INDIVIDUALS

RELATED APPLICATIONS

The present application is a continuation of and claims priority to U.S. patent application Ser. No. 12/198,570, filed Aug. 26, 2008, entitled "Web-Based Services for Querying and Matching Likes and Dislikes of Individuals" and now U.S. Pat. No. 8,458,153, which is incorporated herein by reference in its entirety for all purposes.

FIELD OF THE INVENTION

The present application is generally directed to web-based social and official networking. In particular, the present application describes methods and systems for connecting with users and gathering information on their likes and dislikes based on their profile information.

BACKGROUND

Proliferation of social networking sites has allowed a user to connect with a plurality of other users. The user can view profile information of other users and connect with them using a plurality of communication modes. The social networking sites include user generated content that is disparate and decentralized. With the proliferation of social networking sites and the inconsistent or unstructured form of user generated contents, it is challenging for a user of existing social networking sites to track likes and dislikes of an individual or a group of individuals. The user has to browse a plurality of websites in order to view information on likes, dislikes, preferences and trends associated with either an individual or a group of individuals. Furthermore, the user has to read and interpret user generated content to try to ascertain any information on the likes and dislikes of an individual or a group of individuals.

SUMMARY OF THE INVENTION

The present solution provides methods and web based services for matching likes and dislikes of one or more individuals. Information on likes and dislikes of a plurality of users are stored and/or displayed in a structured form. Such information allows a user to connect with the other individuals more efficiently and helps in efficient organization of events.

In one aspect, a method for centrally providing a profile of a user's degree of preference for one or more items across categories in a plurality of domains of interest in a taxonomy of preferences is described. In one embodiment, the method includes identifying a user's degree of preference for an item from a plurality of indicators. The user's degree of preference for the item is associated with a category in a domain of interest and is stored in a profile of the user. In another embodiment, the profile identifies preferences of the user in a taxonomy of preferences across categories in a plurality of domains of interest.

In one embodiment, the method further includes identifying by the user a degree of like or dislike for the item. In another embodiment, the method includes identifying the user's degree of preference for the item by a second user. In still another embodiment, the method includes providing an emoticon for each of the predetermined indicators of degrees of preference. In yet another embodiment, the emoticon represents a degree of like or dislike. In one embodiment, the predetermined indicators of degrees of preferences indicate one or more of the following preferences: a like for the item, a strong like for the item, a dislike for the item and a strong dislike for the item. In another embodiment, the method includes associating the user's degree of preference for the item with one or more categories. In still another embodiment, the method includes identifying by the taxonomy of preferences in the profile of the user the user's preference for a plurality of items associated with a hierarchy of categories in each domain of interest. In yet another embodiment, the plurality of domains of interest include one or more of the following: food and drink, entertainment, love and relationships, fashion and style, news and gossip, travel, sports, fitness and wellness, and inner me. In another embodiment, the method includes providing a textual description of the user's degree of preference for the item. In a further embodiment, the method includes creating a group and selecting one or more preferences from the user's profile to associate with the group.

In another aspect, a method for centrally accessing a profile of a user identifying the user's degree of preference for one or more items across categories in a plurality of domains of interest of a taxonomy of preferences is described. In one embodiment, the method includes receiving a request to identify a user's degree of preference for a item and determining the user's degree of preference via a profile of the user. In another embodiment, the profile identifies the preferences of the user in a taxonomy of preferences across categories in a plurality of domains of interest. In still another embodiment, the method includes providing a predetermined indicator of the user's degree of preference in response to the request.

In one embodiment, the method includes providing a description of the user's degree of like or dislike of the item. In another embodiment, the method includes providing an emoticon as the indicator of the user's degree of preference. In still another embodiment, the emoticon indicates a degree of like or dislike. In yet another embodiment, the method includes determining one or more categories associated with the item. In one embodiment, the method further includes providing one or more categories in response to the request. In another embodiment, the method includes determining if a requestor of the request is authorized to access the item in the user's profile. In still another embodiment, the method includes determining if the requestor is associated with a group to which the user has provided access to the user's profile. In yet another embodiment, the method includes receiving an access code from the requestor for obtaining access to the user's preference for the item. In one embodiment, the method includes receiving the receiving the request to match the user's degree of preference for the item to one or more degrees of preferences of one or more users in one or more user profiles. In a further embodiment, the method includes determining if the degrees of preferences in profiles of one or more users match the user's preference for the item.

BRIEF DESCRIPTION OF THE FIGURES

The foregoing and other objects, aspects, features, and advantages of the invention will become more apparent and better understood by referring to the following description taken in conjunction with the accompanying drawings, in which:

FIGS. 3A-3K are examples screenshots of the website for providing web based services described herein;

FIGS. 6A, 6B and 6C are example screenshots of embodiments of a system for receiving matching criteria and providing results using the web based service described herein;

FIG. 8 is a flow diagram depicting steps of an embodiment of a method for centrally accessing a profile of a user identifying the user's degree of preference for one or more items across categories in a plurality of domains of interest of a taxonomy of preferences.

DETAILED DESCRIPTION

Figure 1A:
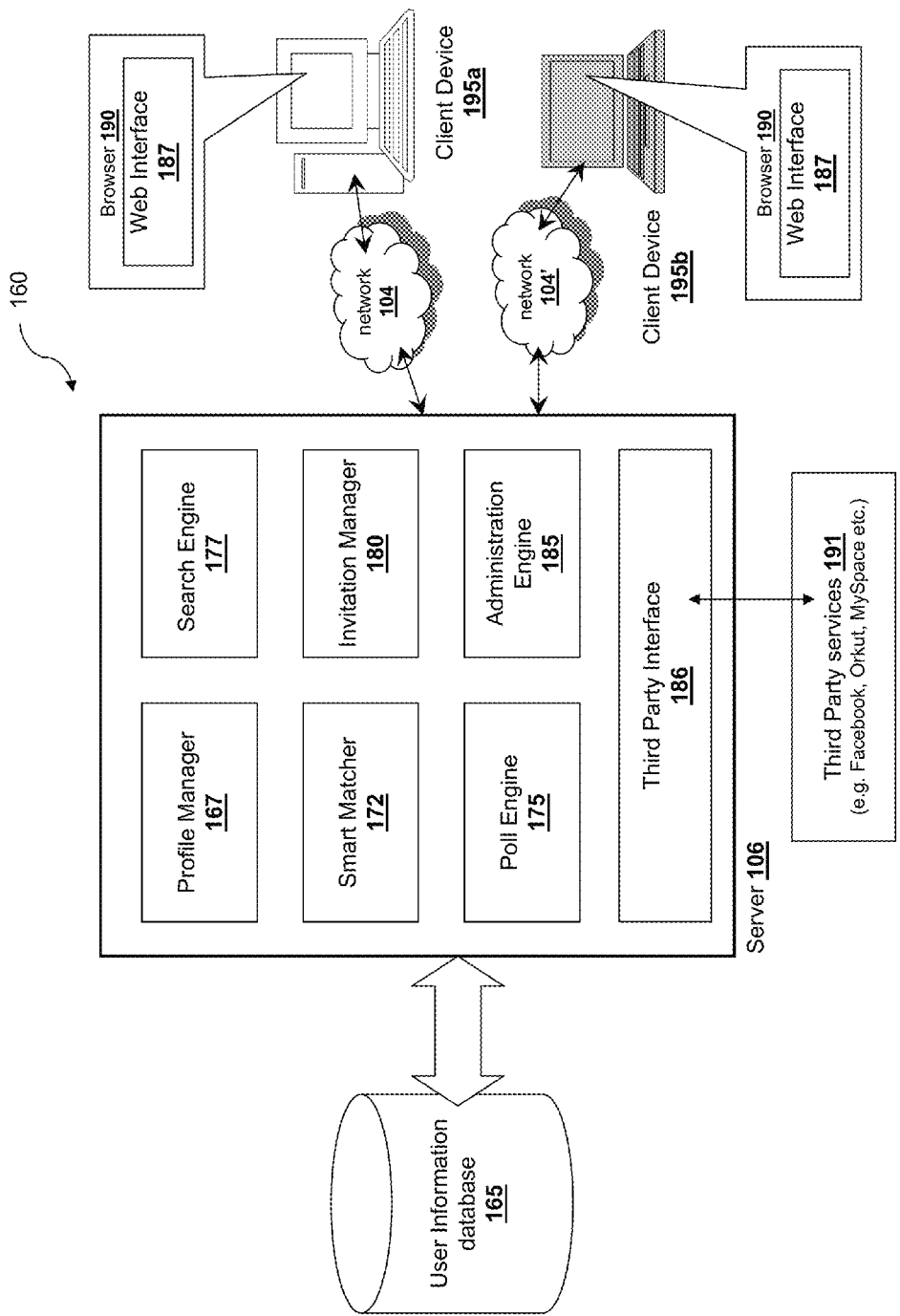
FIG. 1A is a block diagram of an embodiment of an environment to provide web based services for querying and matching likes and dislikes of users.

Referring to FIG. 1, a block diagram of an environment 160 to provide web based services for querying and matching likes and dislikes of users is shown and described. In brief overview, the system includes a server 106 in connection with a user information database 165. Client devices 195 communicate with the server 106 over one or more networks 104 to access the web based services described herein. The server may include one or more of a profile manager 167, a search engine 177, a smart matcher 172 and an invitation manager 180. The server 106 may also include a poll engine 175, and an administration engine 185. The server may include a third party interface 186 that communicates with third party services 191. The client device 195 may execute a browser 190 that displays a web interface 187 for a user to communicate with the server 106.

Although FIG. 1A shows a network 104 and a network 104' between the clients 195 and the server 106, the clients 195 and the server 106 may be on the same network 104. The networks 104 and 104' can be the same type of network or different types of networks. The network 104 and/or the network 104' can be a local-area network (LAN), such as a company Intranet, a metropolitan area network (MAN), or a wide area network (WAN), such as the Internet or the World Wide Web. The network 104 and/or 104' be any type and/or form of network and may include any of the following: a point to point network, a broadcast network, a wide area network, a local area network, a telecommunications network, a data communication network, a computer network, an ATM (Asynchronous Transfer Mode) network, a SONET (Synchronous Optical Network) network, a SDH (Synchronous Digital Hierarchy) network, a wireless network and a wireline network. In some embodiments, the network 104 may comprise a wireless link, such as an infrared channel or satellite band. The topology of the network 104 and/or 104' may be a bus, star, or ring network topology. The network 104 and/or 104' and network topology may be of any such network or network topology as known to those ordinarily skilled in the art capable of supporting the operations described herein.

In one embodiment, the server farm 106 may include one or more modules. In another embodiment, a module may include software, hardware or a combination of software and hardware. In still another embodiment, a module may include one or more of a library, a program, an application, a file, a service, a script, a database or any type or form of executable instructions. In some embodiments, the modules interact with each other. In one embodiment, the server 106 includes one or more of a profile manager 167, a smart matcher 172, a poll engine 175, a search engine 177, an invitation manager 180 and an administration engine 185. In another embodiment, the server 106 may include a third party interface module 186 interacting with third party services 191. Even though FIG. 1A shows the modules on only one server 106, it can be appreciated that in some embodiments, the system may include multiple, logically-grouped servers 106. In these embodiments, the logical group of servers may be referred to as a server farm (not shown) or farm. In some of these embodiments, the servers 106 may be geographically dispersed. In some cases, a farm may be administered as a single entity. In other embodiments, the server farm comprises a plurality of server farms. In one embodiment, the functional modules as shown in FIG. 1A are dispersed over one or more servers 106 in the server farm.

The servers 106 within each farm can be heterogeneous. One or more of the servers 106 can operate according to one type of operating system platform (e.g., WINDOWS NT, manufactured by Microsoft Corp. of Redmond, Wash.), while one or more of the other servers 106 can operate on according to another type of operating system platform (e.g., Unix or Linux). The servers 106 of each farm 107 do not need to be physically proximate to another server 106 in the same farm 107. Thus, the group of servers 106 logically grouped as a farm may be interconnected using a wide-area network (WAN) connection or medium-area network (MAN) connection. For example, a farm may include servers 106 physically located in different continents or different regions of a continent, country, state, city, campus, or room. Data transmission speeds between servers 106 in the farm can be increased if the servers 106 are connected using a local-area network (LAN) connection or some form of direct connection.

The client devices 195a-195b (195 in general) may comprise any type and form of electronic or computing device. In one embodiment, a client device 195 is any type of computing device such as a desktop computer or a laptop computer. In another embodiment, the client device 195 is an electronic equipment capable of connecting to a network. In still another embodiment, the client device 195 is any type and form of communications device. In yet another embodiment, the client device 195 is a cellular phone. In one embodiment, the client device 195 is a BLACKBERRY device manufactured by Research in Motion (RIM) of Waterloo, Ontario, Canada. In another embodiment, the client device 195 is a personal digital assistant (PDA) phone or smartphone such as one manufactured by Palm Inc. of Sunnyvale, Calif. In still another embodiment, the client device 195 is an IPHONE device manufactured by Apple Inc. of Cupertino, Calif. In further embodiments, the client device 195 can be any type and form of web-enabled electronic gadget and equipment as apparent to one skilled in the art.

Furthermore, the client device 195 may include a network interface to interface to a Local Area Network (LAN), Wide Area Network (WAN) or the Internet through a variety of connections including, but not limited to, standard telephone lines, LAN or WAN links (e.g., 802.11, T1, T3, 56 kb, X.25), broadband connections (e.g., ISDN, Frame Relay, ATM), wireless connections, or some combination of any or all of the above. The network interface may comprise a built-in network adapter, network interface card, PCMCIA network card, card bus network adapter, wireless network adapter, USB network adapter, modem or any other device suitable for interfacing the client device 195 to any type of network capable of communication and performing the operations described herein.

The client device 195 may include any type and form of operating system, which control scheduling of tasks and access to system resources. In some embodiments, the client device 195 can be running any operating system such as any of the versions of the Microsoft® Windows operating systems, the different releases of the Unix and Linux operating systems, any version of the Mac OS® for Macintosh computers, any embedded operating system, any real-time operating system, any open source operating system, any proprietary operating system, any operating systems for mobile computing devices, or any other operating system capable of running on the computing device and performing the operations described herein. Typical operating systems include: WINDOWS 3.x, WINDOWS 95, WINDOWS 98, WINDOWS 2000, WINDOWS NT 3.51, WINDOWS NT 4.0, WINDOWS CE, and WINDOWS XP, all of which are manufactured by Microsoft Corporation of Redmond, Wash.; MacOS, manufactured by Apple Computer of Cupertino, Calif.; OS/2, manufactured by International Business Machines of Armonk, N.Y.; and Linux, a freely-available operating system distributed by Caldera Corp. of Salt Lake City, Utah, or any type and/or form of a Unix operating system, among others.

In one embodiment, the client device 195 executes a browser 190 to communicate with the server 106. In another embodiment, an agent 190' (not shown) may be installed and executed on the client device 195 to communicate with the server 106. In still another embodiment, the browser 190 or the agent 190' displays a web interface 187 for a user to interact with the web-based service. In one embodiment, the web interface 187 comprises a script such as JavaScript or asynchronous JavaScript and XML (AJAX). In another embodiment, the web interface 187 may comprise one or more of the following: static images, animated images, audio files and video files. In one of these embodiments, the static image is a raster graphic format such as GIF, JPEG or PNG. In another of these embodiments, the static image is a vector format such as SVG Flash. In still another embodiment, the animated image is an animated GIF image, a Java applet or a Shockwave image. In yet another embodiment, the audio file may be of one of a plurality of formats including MIDI, WAV, M3U and MP3. In another embodiment, the video file may be of one of a plurality of formats including WMV, RM, FLV, MPG and MOV. In one embodiment, the web interface 187 may comprise interactive text, illustrations and buttons.

In one embodiment, the web interface 187 displays the output of one or more functional modules, applications, programs or executable files executing on the server 106. In one embodiment, the functional modules are logically grouped using software. In another embodiment, the functional modules may have physical interconnections. In still another embodiment, the functional modules may be implemented using one or more technology, protocol and software package as apparent to one skilled in the art. In yet another embodiment, the functional modules may use any type and form of interfaces and/or interprocess communications. In one embodiment, implementation of the functional modules may require the use of one or more programming languages such as Java, Python, C and C++. In another embodiment, one or more web-based technologies, protocols and software such as AJAX, SOAP, Flash, ColdFusion Markup Language (CFML) and HyperText Markup Language (HTML) are used in implementing the functional modules. In still another embodiment, the functional modules are hosted in an application server such as ColdFusion.

The profile manager 167 creates, modifies, stores and/or manages one or more user profiles. In one embodiment, the profile manager 167 allows a user of the web-based service to create a profile for himself or herself. In another embodiment, the profile manager 167 displays the profile of one or more friends to the user. In still another embodiment, the profile manager maintains a list of friends for a particular user. In one embodiment, the profile manager manages a plurality of details on a user. Examples of such details include but are not limited to: name, age, gender, sexual orientation, address, birthday, hometown, school, relationship status, email, phone, web address, instant message links, photos and other details as apparent to one skilled in the art. In another embodiment, the profile manager also manages likes and dislikes of a user as specified by the user. In still another embodiment, the profile manager 167 creates different versions of a user's profile. For example, in one embodiment, the profile manager 167 creates separate profile views for an editor and a viewer. The editor allows a user to edit his/her profile while a viewer allows another user to view the profile. In another embodiment, the profile manager 167 allows a user to manage, modify, add and/or edit likes and dislikes of the user connected to the user's profile.

The search engine 177 queries or otherwise conducts search on any accessible information source. The search engine 177 may interface to and search any one or more of the profile manager 167, the smart matcher 172, the invitation manager 180, the poll engine 180, the administration engine 185, the user information database 165 and any other functional module as apparent to one skilled in the art. In one embodiment, the search engine 177 may search any accessible device, storage or memory associated with any functional module. In another embodiment, the search engine may search any part or the client 195 and/or the server 106. In still another embodiment, the search engine 177 conducts searches the user database 165. In yet another embodiment, the search engine 177 may search for likes and dislikes of one or more users. In some embodiments, the search engine 177 may search within any third party services 191. In one of these embodiments, the search engine 177 may communicate with the third party services 191 via the third party interface 186. In one embodiment, the search engine 177 may be implemented as a part of the web-based service. In another embodiment, existing search engine services such as one provided by Google Inc. of Mountain View, Calif. may be incorporated as the search engine 177. It can be appreciated that the search engine 177 may use any search algorithm, logic, criteria and technique as apparent to one skilled in the art.

The smart matcher 172 performs any type and form of matching of one or more profiles using one or more matching criteria. In one embodiment, a smart matcher 172 searches for matches according to one or more matching criteria provided by a user. In another embodiment, the smart matcher 172 presents results of a match search in any type and form of graphical and/or textual representations. For example, the smart matcher 172 may present the matches via one or more of a table, a graph, a pictorial representation or a textual representation. It should be appreciated that the smart matcher 172 may be implemented using any type and form of one or more matching algorithms as apparent to one skilled in the art. In one embodiment, the smart matcher 172 matches one or more items of like and dislike of one or more users. In another embodiment, the smart matcher 172 matches the likes and dislikes based on a degree of preference for the item. The smart matcher 172 and its functionalities are discussed in further detail with reference to FIGS. 6A and 6B.

The invitation manager 180 creates, distributes, manages and/or reads one or more invitations. In one embodiment, the web based services described herein allows a user to connect with a plurality of other users via the invitation manager 180. In another embodiment, a user can invite another user to connect to his profile. In still another embodiment, an invitation manager 180 manages the invitations that a user sends out to others. The invitation manager 180 has several functionalities. In one embodiment, the invitation manager 180 creates invitations as desired by a user and sends them out. In another embodiment, the invitation manager 180 tracks the responses and processes the feedback received responsive to the invitations. In still another embodiment, the invitation manager 180 generates one or more reports based on the responses received from users to whom the invitations are sent out. In yet another embodiment, the invitation manager 180 may take an action based on the responses received.

The invitations sent out by the invitation manager 180 may be related to a plurality of possible reasons or events. In one embodiment, a user can send an invitation for viewing his profile. In another embodiment, an invitation may include a request to connect to the user as a friend. In still another embodiment, the invitation may include details of an event organized by a user. In yet another embodiment, the invitation may include a request to attend, respond to, organize, view or take an action on an event described by a user creating the invitation. In one embodiment, the invitation manager 180 can be configured to send out invitations to the friends of a user automatically when the user creates or organizes an event. In another embodiment, the user may use the invitation manager 180 to manually send out invitations to his or her friends. In still another embodiment, the invitation may include one or more queries about likes and/or dislikes of a recipient. In yet another embodiment, the invitation may include information on the likes and/o dislikes of a sender. The invitation may have any form or content. In one embodiment, the invitation is sent as an email. In another embodiment, the invitation is sent as a link to a webpage. In still another embodiment, the invitation may include any form of content including, but not limited to one or more of graphical, textual or any form of interactive content. In yet another embodiment, the invitation may require a recipient to respond to one or more queries and/or questions.

The poll engine 175 sends, receives, analyzes and stores results on polls on any topic. In one embodiment, the user uses a poll engine 175 to receive opinions of other users on a topic of interest. As an example, if a user is organizing a party, he or she may poll prospective attendees on a choice of dates before finalizing the date of the party. In one embodiment, the poll engine 175 processes the responses from responders and generates a report based on the responses. In another embodiment, the poll engine 175 automatically creates a survey when a user enters a subject matter for the survey. In still another embodiment, a user can use the poll engine 175 to manually create a survey. In yet another embodiment, the poll engine 175 includes a wizard for creating and disseminating the survey or poll. In a further embodiment, the poll engine 175 receives input from one or more users on the users' likes, dislike and/or degree of likes or dislike for one or more items.

The administration engine 185 creates, manages, modifies or otherwise administers user accounts. The administrator can use the administration engine 185 to manage the rights and privileges of different users of the system. In another embodiment, the administration engine 185 can be used to grant or deny one or more privileges to a user. In still another embodiment, the administration engine 185 may automatically take an action based on an occurrence of a predefined event. As an example, the administration engine 185 may block access of a user to his/her account if an incorrect password is entered a predetermined number of times. In yet another embodiment, the administration engine 185 may include a password manager to retrieve forgotten passwords and/or usernames for a user. In one embodiment, the administration engine 185 can be used to create, modify, edit, delete or otherwise administer likes and dislikes of users for one or more items. In another embodiment, the administration engine 185 may be used to create or modify one or more categories and/or subcategories in the taxonomy. In still another embodiment, the administration engine 185 is used to manage, modify or otherwise administer the levels of likes and/or dislikes of users for one or items.

In some embodiments, a third party interface 186 links, interfaces or connects one or more third party services 191. In one embodiment, the third party service 191 may include any web based social networking service such as ORKUT provided by Google Inc. of Mountain View, Calif., FACEBOOK provided by Facebook Inc. of Palo Alto, Calif. or MYSPACE provided by Fox Interactive Media of Beverly Hills, Calif. In another embodiment, the third party services 191 may include email services such as GMAIL provided by Google Inc. of Mountain View Calif., YAHOO! mail provided by Yahoo! Inc. of Sunnyvale, Calif. or any other email service. In still another embodiment, the third party interface 186 imports information from a third party service 191 as a part of a user's profile. In yet another embodiment, information imported from a third party service may include but is not limited to: friends list, contacts, groups, preferences and any other type and form of user generated content. In a further embodiment, the In one embodiment, the third party interface 186 may process information obtained from third party services 191 to obtain derived information. In another embodiment, the third party service 191 may communicate with the server 106 and/or any module to provide any of the functionalities described herein.

In some embodiments, the third party interface 186 includes a widget. The widget allows information of any form to be captured and linked to services described herein. In some embodiments, one or more of text, sound clips, images, files, executable files, web address, video, interactive content or any other content may be imported to the widget. In one of these embodiments, the content is imported from any webpage or web based service. In another of these embodiments, the content is imported from a local storage media. In one embodiment, the widget allows tagging and linking of the imported content to the services described herein. In another embodiment, the tagging includes specifying a like or dislike for the imported content and/or a degree of preference. In yet another embodiment, the tagging and/or linking includes specifying for the imported content, one or more of a domain of interest, category and subcategory in a taxonomy of preferences.

The widget can be implemented, executed, launched or used in any form. In one embodiment, the widget is installed as a part of a browser 190. In another embodiment, the widget is executed as one or more of an application, a script, a file, a library, a service or any form of executable instructions. In still another embodiment, the widget acts as a local agent for the web based services described herein. In one embodiment, the widget is always in communication to the server 106. In another embodiment, the widget locally stores information and/or imported content and transfers the information and/or content to the server 106 when the web based services described herein are accessed.

In some embodiments, the widget is implemented, executed, launched and used in a mobile computing device. Examples of such a mobile computing device include but are not limited to a laptop computer, a personal digital assistant (PDA), a BLACKBERRY device developed by Research in Motion (RIM) of Waterloo, Ontario, Canada, an IPHONE device developed by Apple Computers Inc. of Cupertino, Calif. and any other smartphone and cell phone as apparent to one skilled in the art. In one embodiment, images and/or video captured by a camera on the mobile device may be imported to the widget. In another embodiment, one or more of speech, music or any other sound captured using the mobile device may be imported to the widget. In still another embodiment, the widget is developed using a third party software developer kit such as one provided by Apple Inc. of Cupertino, Calif. for the IPHONE device.

In one embodiment, information on users and accounts are stored in a user information database 165. In one embodiment, the user information database 165 stores information on the users' profiles. In another embodiment, the user information database 165 stores information on user accounts. In still other embodiments, the user information database 165 stores information on one or more of responses to invitations, responses to polls and surveys, taxonomy of user preferences and matches. In one embodiment, the user information database 165 comprises any type and form of relational database, non-relational database, object database, or object-oriented database. In some embodiments, the user information database 165 comprises any of the database products manufactured by Oracle of Redwood Shores, Calif. In another example, the user information database 165 comprises any of the versions of Microsoft SQL Server manufactured by Microsoft Corporation of Redmond, Wash. In one embodiment, the user information database 165 provides an Open Database Connectivity (ODBC) interface for accessing the database. In another embodiment, the user information database 165 comprises a server farm of databases. In some embodiments, the user information database 165 comprises a database cluster.

In other embodiments, the user information database 165 comprises a file, such as a CSV (command separated) formatted file. In another embodiment, the user information database 165 comprises a file having fields or values delimited in any manner by using fixed length field or any predetermined field or value delimiters. The file may have a structure, format, and/or content readable and understandable by the centralized service 110, or any portion thereof. In other embodiments, the user information database 165 includes an application, program, software, service, process or task providing access to data. The user information database 165 may provide any type and form of application programming interface (API), such as an XML, object, or web-service based interface for accessing or providing data.

Figure 1B:
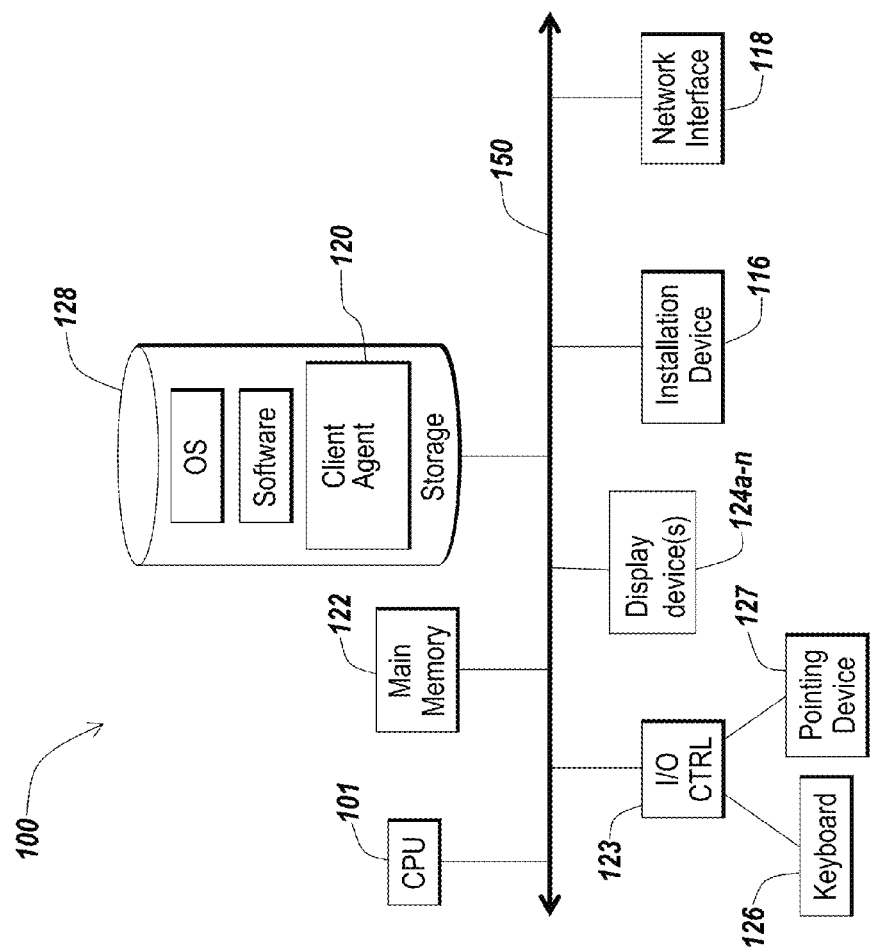
FIGS. 1B and 1C are block diagrams of embodiments of a computing device.
Figure 1C:
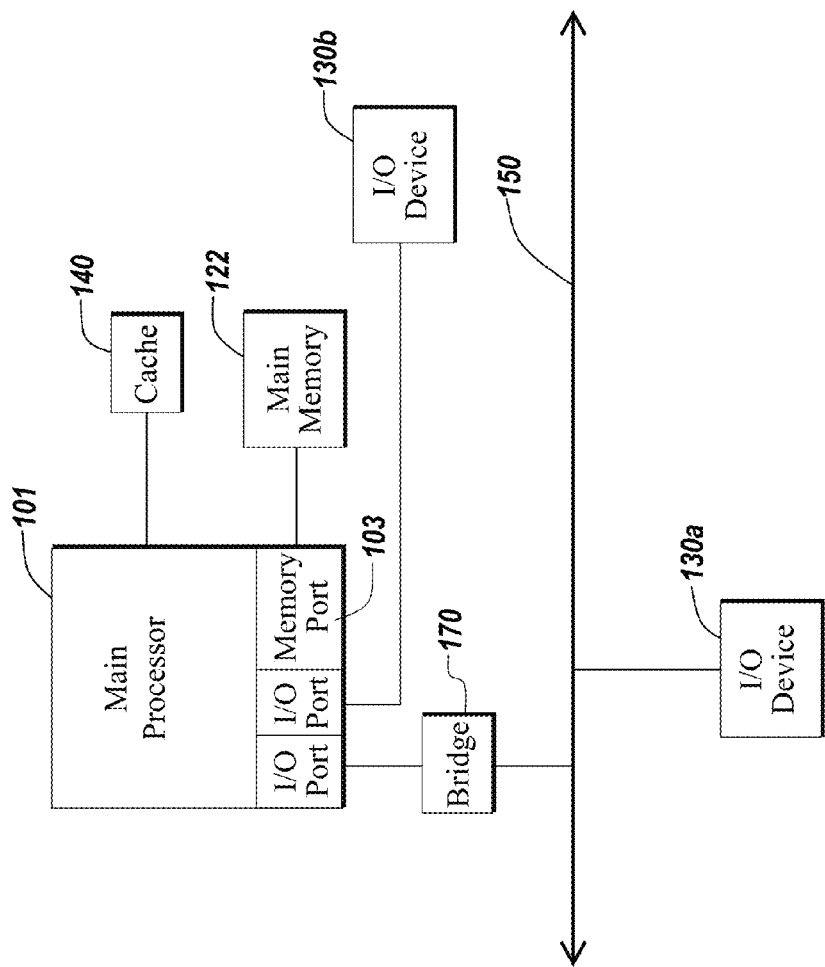

The client 195, server 106, and database 165 may be deployed as and/or executed on any type and form of computing device, such as a computer, network device or appliance capable of communicating on any type and form of network and performing the operations described herein. FIGS. 1B and 1C depict block diagrams of a computing device 100 useful for practicing an embodiment of the client 195, server 106 or database 165. As shown in FIGS. 1B and 1C, each computing device 100 includes a central processing unit 101, and a main memory unit 122. As shown in FIG. 1B, a computing device 100 may include a visual display device 124, a keyboard 126 and/or a pointing device 127, such as a mouse. Each computing device 100 may also include additional optional elements, such as one or more input/output devices 130a-130b (generally referred to using reference numeral 130), and a cache memory 140 in communication with the central processing unit 101.

The central processing unit 101 is any logic circuitry that responds to and processes instructions fetched from the main memory unit 122. In many embodiments, the central processing unit is provided by a microprocessor unit, such as: those manufactured by Intel Corporation of Mountain View, Calif.; those manufactured by Motorola Corporation of Schaumburg, Ill.; those manufactured by Transmeta Corporation of Santa Clara, Calif.; the RS/6000 processor, those manufactured by International Business Machines of White Plains, N.Y.; or those manufactured by Advanced Micro Devices of Sunnyvale, Calif. The computing device 100 may be based on any of these processors, or any other processor capable of operating as described herein.

Main memory unit 122 may be one or more memory chips capable of storing data and allowing any storage location to be directly accessed by the microprocessor 101, such as Static random access memory (SRAM), Burst SRAM or Synch-Burst SRAM (BSRAM), Dynamic random access memory (DRAM), Fast Page Mode DRAM (FPM DRAM), Enhanced DRAM (EDRAM), Extended Data Output RAM (EDO RAM), Extended Data Output DRAM (EDO DRAM), Burst Extended Data Output DRAM (BEDO DRAM), Enhanced DRAM (EDRAM), synchronous DRAM (SDRAM), JEDEC SRAM, PC100 SDRAM, Double Data Rate SDRAM (DDR SDRAM), Enhanced SDRAM (ESDRAM), SyncLink DRAM (SLDRAM), Direct Rambus DRAM (DRDRAM), or Ferroelectric RAM (FRAM). The main memory 122 may be based on any of the above described memory chips, or any other available memory chips capable of operating as described herein. In the embodiment shown in FIG. 1B, the processor 101 communicates with main memory 122 via a system bus 150 (described in more detail below). FIG. 1B depicts an embodiment of a computing device 100 in which the processor communicates directly with main memory 122 via a memory port 103. For example, in FIG. 1C the main memory 122 may be DRDRAM.

FIG. 1C depicts an embodiment in which the main processor 101 communicates directly with cache memory 140 via a secondary bus, sometimes referred to as a backside bus. In other embodiments, the main processor 101 communicates with cache memory 140 using the system bus 150. Cache memory 140 typically has a faster response time than main memory 122 and is typically provided by SRAM, BSRAM, or EDRAM. In the embodiment shown in FIG. 1B, the processor 101 communicates with various I/O devices 130 via a local system bus 150. Various busses may be used to connect the central processing unit 101 to any of the I/O devices 130, including a VESA VL bus, an ISA bus, an EISA bus, a MicroChannel Architecture (MCA) bus, a PCI bus, a PCI-X bus, a PCI-Express bus, or a NuBus. For embodiments in which the I/O device is a video display 124, the processor 101 may use an Advanced Graphics Port (AGP) to communicate with the display 124. FIG. 1C depicts an embodiment of a computer 100 in which the main processor 101 communicates directly with I/O device 130 via HyperTransport, Rapid I/O, or InfiniBand. FIG. 1C also depicts an embodiment in which local busses and direct communication are mixed: the processor 101 communicates with I/O device 130 using a local interconnect bus while communicating with I/O device 130 directly.

The computing device 100 may support any suitable installation device 116, such as a floppy disk drive for receiving floppy disks such as 3.5-inch, 5.25-inch disks or ZIP disks, a CD-ROM drive, a CD-R/RW drive, a DVD-ROM drive, tape drives of various formats, USB device, hard-drive or any other device suitable for installing software and programs such as any client agent 120, or portion thereof. The computing device 100 may further comprise a storage device 128, such as one or more hard disk drives or redundant arrays of independent disks, for storing an operating system and other related software, and for storing application software programs such as any program related to the client agent 120. Optionally, any of the installation devices 116 could also be used as the storage device 128. Additionally, the operating system and the software can be run from a bootable medium, for example, a bootable CD, such as KNOPPIX®, a bootable CD for GNU/Linux that is available as a GNU/Linux distribution from knoppix.net.

Furthermore, the computing device 100 may include a network interface 118 to interface to a Local Area Network (LAN), Wide Area Network (WAN) or the Internet through a variety of connections including, but not limited to, standard telephone lines, LAN or WAN links (e.g., 802.11, T1, T3, 56 kb, X.25), broadband connections (e.g., ISDN, Frame Relay, ATM), wireless connections, or some combination of any or all of the above. The network interface 118 may comprise a built-in network adapter, network interface card, PCMCIA network card, card bus network adapter, wireless network adapter, USB network adapter, modem or any other device suitable for interfacing the computing device 100 to any type of network capable of communication and performing the operations described herein.

A wide variety of I/O devices 130*a*-130*n* may be present in the computing device 100. Input devices include keyboards, mice, trackpads, trackballs, microphones, and drawing tablets. Output devices include video displays, speakers, inkjet printers, laser printers, and dye-sublimation printers. The I/O devices 130 may be controlled by an I/O controller 123 as shown in FIG. 1B. The I/O controller may control one or more I/O devices such as a keyboard 126 and a pointing device 127, e.g., a mouse or optical pen. Furthermore, an I/O device may also provide storage 128 and/or an installation medium 116 for the computing device 100. In still other embodiments, the computing device 100 may provide USB connections to receive handheld USB storage devices such as the USB Flash Drive line of devices manufactured by Twintech Industry, Inc. of Los Alamitos, Calif.

In some embodiments, the computing device 100 may comprise or be connected to multiple display devices 124*a*-124*n*, which each may be of the same or different type and/or form. As such, any of the I/O devices 130*a*-130*n* and/or the I/O controller 123 may comprise any type and/or form of suitable hardware, software, or combination of hardware and software to support, enable or provide for the connection and use of multiple display devices 124*a*-124*n* by the computing device 100. For example, the computing device 100 may include any type and/or form of video adapter, video card, driver, and/or library to interface, communicate, connect or otherwise use the display devices 124*a*-124*n*. In one embodiment, a video adapter may comprise multiple connectors to interface to multiple display devices 124*a*-124*n*. In other embodiments, the computing device 100 may include multiple video adapters, with each video adapter connected to one or more of the display devices 124*a*-124*n*. In some embodiments, any portion of the operating system of the computing device 100 may be configured for using multiple displays 124*a*-124*n*. In other embodiments, one or more of the display devices 124*a*-124*n* may be provided by one or more other computing devices, such as computing devices 100*a* and 100*b* connected to the computing device 100, for example, via a network. These embodiments may include any type of software designed and constructed to use another computer's display device as a second display device 124*a* for the computing device 100. One ordinarily skilled in the art will recognize and appreciate the various ways and embodiments that a computing device 100 may be configured to have multiple display devices 124*a*-124*n*.

In further embodiments, an I/O device 130 may be a bridge 170 between the system bus 150 and an external communication bus, such as a USB bus, an Apple Desktop Bus, an RS-232 serial connection, a SCSI bus, a FireWire bus, a FireWire 800 bus, an Ethernet bus, an AppleTalk bus, a Gigabit Ethernet bus, an Asynchronous Transfer Mode bus, a HIPPI bus, a Super HIPPI bus, a SerialPlus bus, a SCI/LAMP bus, a FibreChannel bus, or a Serial Attached small computer system interface bus.

A computing device 100 of the sort depicted in FIGS. 1B and 1C typically operate under the control of operating systems, which control scheduling of tasks and access to system resources. The computing device 100 can be running any operating system such as any of the versions of the Microsoft® Windows operating systems, the different releases of the Unix and Linux operating systems, any version of the Mac OS® for Macintosh computers, any embedded operating system, any real-time operating system, any open source operating system, any proprietary operating system, any operating systems for mobile computing devices, or any other operating system capable of running on the computing device and performing the operations described herein. Typical operating systems include: WINDOWS 3.x, WINDOWS 95, WINDOWS 98, WINDOWS 2000, WINDOWS NT 3.51, WINDOWS NT 4.0, WINDOWS CE, and WINDOWS XP, all of which are manufactured by Microsoft Corporation of Redmond, Wash.; MacOS, manufactured by Apple Computer of Cupertino, Calif.; OS/2, manufactured by International Business Machines of Armonk, N.Y.; and Linux, a freely-available operating system distributed by Caldera Corp. of Salt Lake City, Utah, or any type and/or form of a Unix operating system, among others.

In other embodiments, the computing device 100 may have different processors, operating systems, and input devices consistent with the device. For example, in one embodiment the computer 100 is a Treo 180, 270, 1060, 600 or 650 smart phone manufactured by Palm, Inc. In this embodiment, the Treo smart phone is operated under the control of the PalmOS operating system and includes a stylus input device as well as a five-way navigator device. Moreover, the computing device 100 can be any workstation, desktop computer, laptop or notebook computer, server, handheld computer, mobile telephone, any other computer, or other form of computing or telecommunications device that is capable of communication and that has sufficient processor power and memory capacity to perform the operations described herein.

Figure 2:
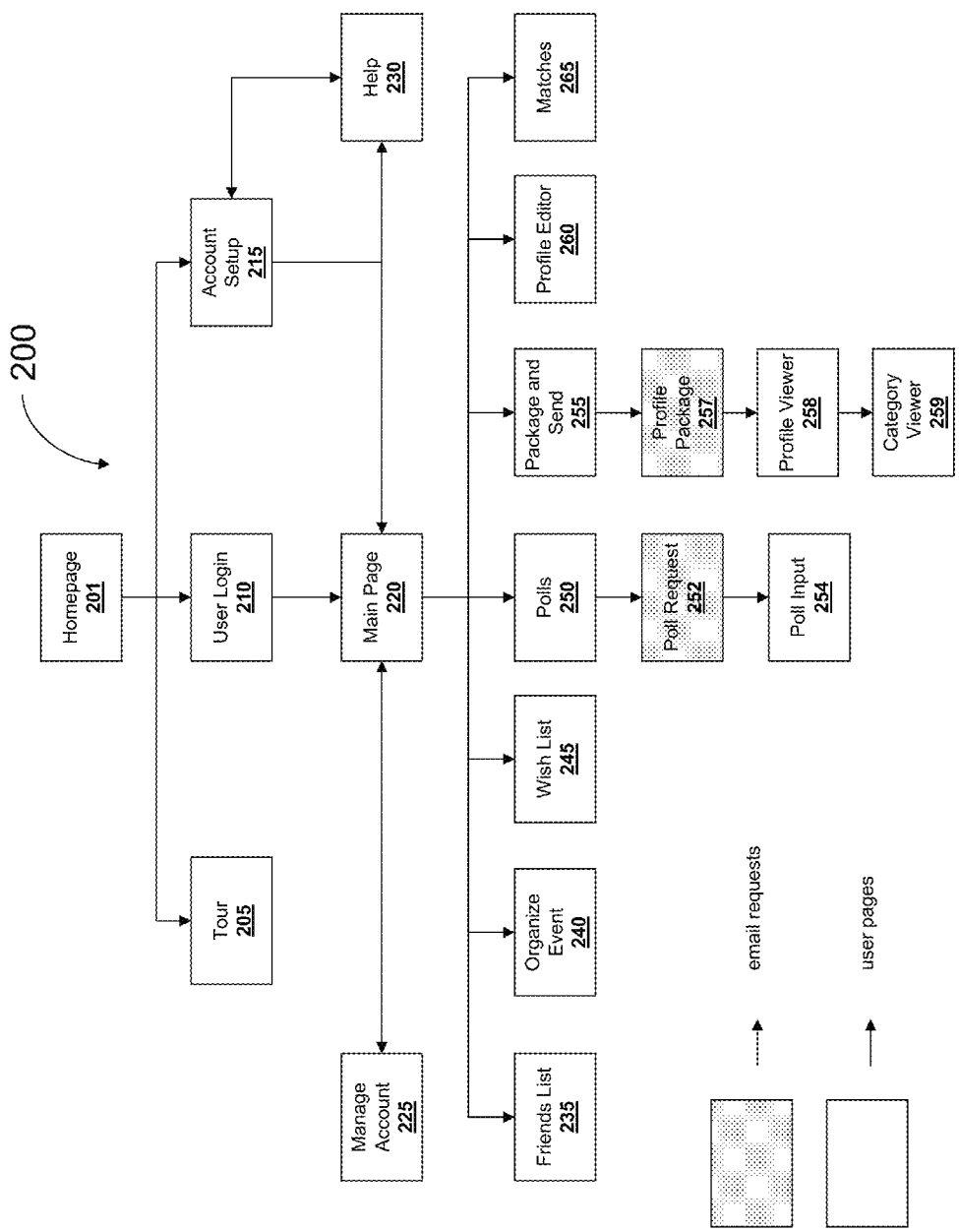
FIG. 2 is an embodiment of an organization chart of a website for providing web based services described herein.

Referring now to FIG. 2, an embodiment of an organization chart 200 of a website or web interface 187 for providing web based services described herein is shown and described. In one embodiment, the web interface is displayed on a browser when the website is accessed by a user. In another embodiment, the web interface may be displayed on a dedicated agent executing on a client device 195. In still another embodiment, the web interface 187 includes a homepage 201 that is displayed when the website is accessed. In one embodiment, the homepage 201 includes an overview of the website and describes the services provided by the website. In another embodiment, the homepage 201 includes one or more hyperlinks to a tour 205 that provides the overview and description of the website. It should be appreciated that the homepage 201 and any other page in the website may be created using any technology, software, tool or language used to create web pages as apparent to one skilled in the art. The homepage 201 or any other page in the website may include any form and nature of content including but not limited to text, graphics, images, sounds, moving images, interactive components, frames, forms, objects and hyperlinks.

In one embodiment, a user can log in to access the web based services via one or more fields 210 provided on the home page 201. In another embodiment, the log in fields 210 may include text or image based verification methods. In some embodiments such methods are incorporated to prevent malicious agents and software such as bots to access the website. In another embodiment, the homepage 201 includes a link to account setup 215 to allow new users to create accounts. In still another embodiment, the homepage 201 includes hyperlinks for password and/or username retrieval. In yet another embodiment, the homepage 201 may include one or more links to contacts, legal disclaimers, corporate information and other information.

In one embodiment, the account setup 215 opens up a new page or tab allowing a user to create an account. In another embodiment, the account setup page includes one or more hyperlinks to a 'help' page 230 that contains detailed instructions and descriptions. In still another embodiment, the instructions and descriptions are displayed on the account setup page 215. In yet another embodiment, the help page 230 includes one or more of an index of topics, a search field and a list of frequently asked questions. in one embodiment, successful completion of the account setup takes the user to a main page 220. In another embodiment, successful completion of the account setup takes the user to the login page 210. In still another embodiment, an account activation link is sent to an email address specified by the user during the account setup. In one embodiment, the account is activated on clicking the activation link and the user is taken to one of the login page 210 or the main page 220 responsive to the activation. In another embodiment, the account setup 215 requires a user to enter one or more of the following information in a fillable form: username, password, first name, last name, email, birthday, address and gender. In still another embodiment, the address information may include street name, city, state and country. In yet another embodiment, the account setup 215 allows a user to upload am image or picture. In a further embodiment, the profile is populated with a default image if no picture or image is uploaded by the user. In one embodiment, the account setup 215 page includes a hyperlink to one or more pages describing the terms of service. In another embodiment, the account setup 215 includes a checkbox that a user needs check to indicate that the user agrees to the terms of service. In still another embodiment, the account setup 215 allows the user to confirm or cancel information entered by the user. In one embodiment, canceling discards the content of the form and returns the user to the homepage 201. In another embodiment, confirming validates the form and/or posts the information entered by the user to the server 106 to setup a new account. In still another embodiment, the user is taken to a account confirmation page to review all entered information prior to the setup of the new account. In yet another embodiments, failure to validate the form reloads the form with reasons and/or explanations of errors and/or omissions.

The main page 220 includes an overview of a user's account details. In one embodiment, the main page 220 includes an account management link 225 that allows the user to manage and edit details pertaining to the account. In another embodiment, the account management details include but are not limited to name, email, username, password, one or more hint questions and answers for password retrieval, parameters for controlling levels of visibility of account to other users, personalization of page layouts and management of friends' lists and groups.

In one embodiment, the main page 220 includes links to different sections and functionalities of the web based services described herein. In another embodiment, the main page 220 includes hyperlinks to one or more of the following: a friends' list 235, a wish list 245 and a profile editor 260. In still another embodiment, the main page 220 includes hyperlinks and/or interactive content to allow a user to organize an event 240, manage polls, package and send profiles 255 and manage matches 265. The lists and functionalities are described in further details with reference to FIG. 3A-3J.

In one embodiment, a user can initiate email requests to other users from a page of the website. For example, a request for a poll 252 can be initiated from the polls page 250. The poll request 252 is emailed to one or more users seeking their feedback. Similarly, a user can send his profile via an email from the package and send page 255 as a profile package 257. In another embodiment, the poll request email 252 includes a link to a poll input page 254 where the user can provide his feedback. In still another embodiment, a user can send his response to the poll request 252 via email from which the response or feedback is extracted to the poll input page. In yet another embodiment, the profile package 257 email includes a link to the profile of the user sending the package. In a further embodiment, the profile package email includes the profile of the user. In one embodiment, the profile package 257 email may include a code for accessing the profile of the sending user. A receiving user enters the received code in a field on the website or web interface 187 to access the profile of the sending user.

Figure 3A:
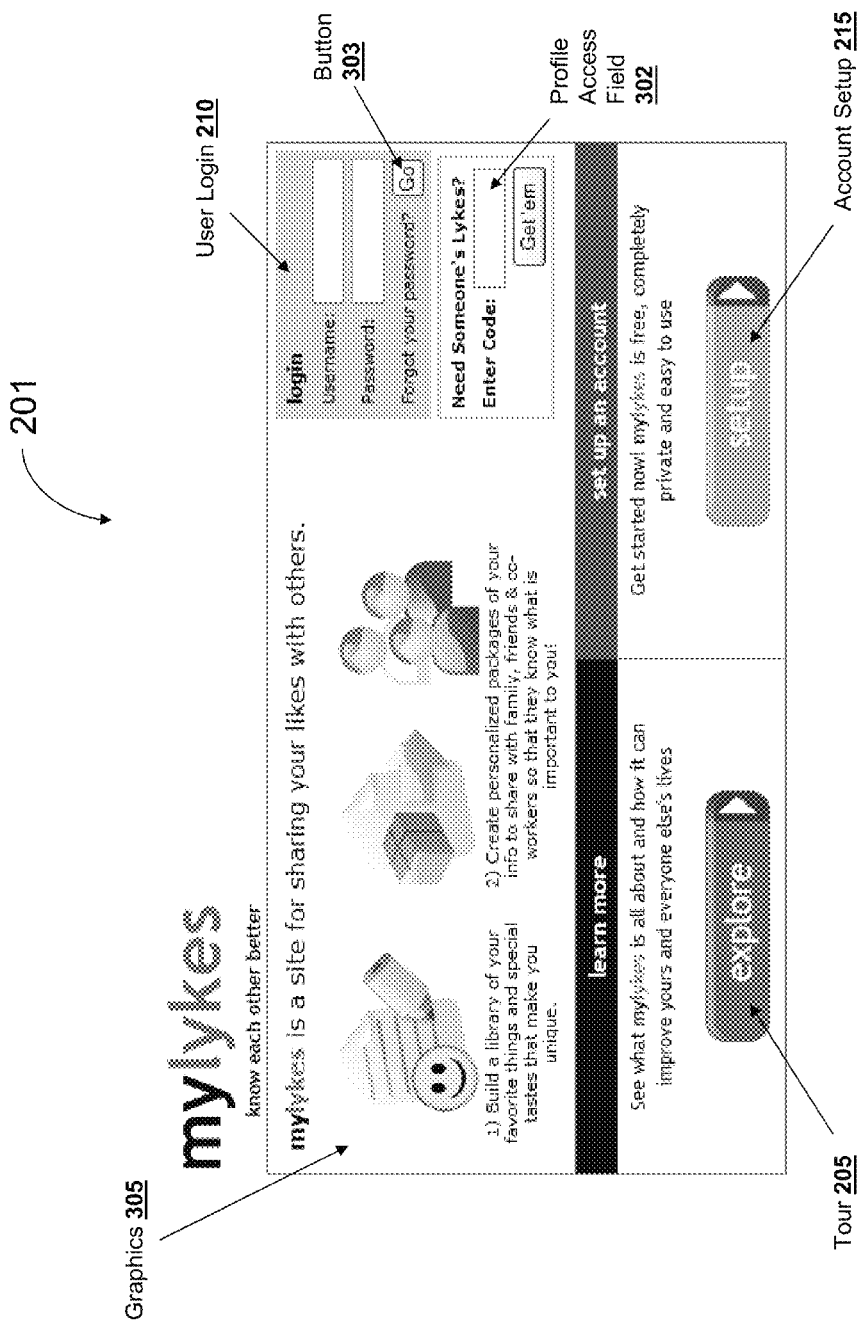
Figure 3B:
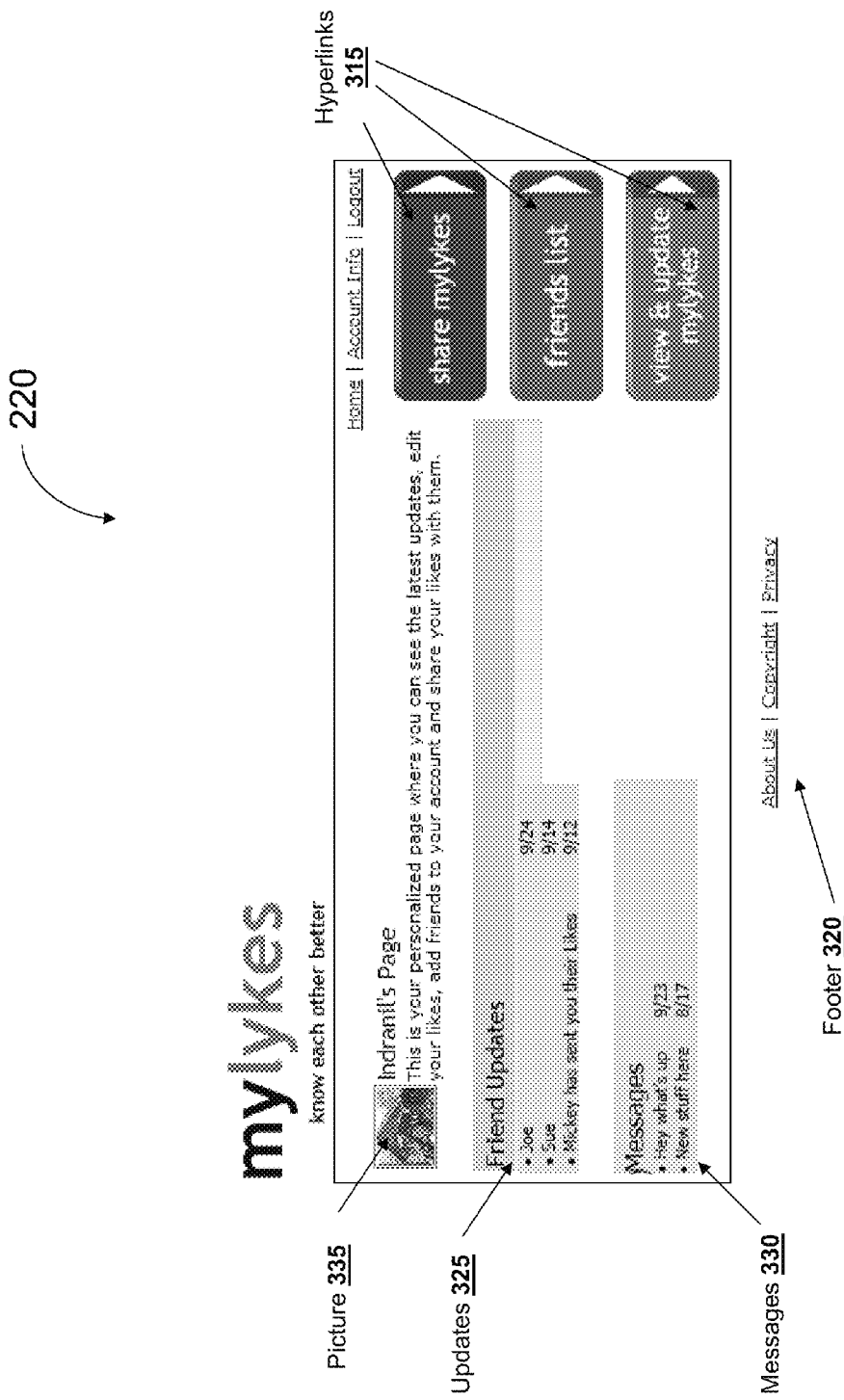

Referring now to FIG. 3A, an example embodiment of the homepage 201 is shown. The homepage 201 allows a user to log in to the website via the user login field 210. In one embodiment, the login information includes a username and a password. In another embodiment, the username and password may be setup during account setup following one or more rules on the length and/or nature of the username and password. In another embodiment, the login field 210 includes an interactive button 303 that posts entries for username and password and validates the user against a database 165 storing the username and password combinations. In still another embodiment, functionality of the button 303 is invoked by pressing the return/enter key. In yet another embodiment, the homepage 201 displays an error message of failed login if the username and/or password fail to validate the user against the database 165. In one embodiment, the homepage 201 may include one or more portions of graphics 305. In another embodiment, the graphics 305 may include any image, movie or interactive content. In another embodiment, the homepage 201 allows a user to directly access a second user's profile by entering a code in a profile access field 302. In one embodiment, the code is provided to the user by the second user. In another embodiment, the homepage 201 includes interactive buttons and/or hyperlinks to the tour 205 and the account setup 215.

In one embodiment, a user is taken to the main page 220 after logging in. In another embodiment, the main page 220 includes a picture 335 associated with the user. In still another embodiment, the picture 335 is a photograph. In other embodiments, the picture 335 may be any form of graphics, movie or image as apparent to one skilled in the art. In yet another embodiment, the picture 335 is accompanied by a description. In another embodiment, the picture 335 may be hyperlinked to a larger and/or expanded version of the picture. In one embodiment, the main page 220 includes update information 325 on friends. In another embodiment, the updates 325 include a listing of friends who have updated their profiles. In still another embodiment, the updates 325 include a list of friends who have sent their profile to the user. In yet another embodiment, friends who send their profiles to the user, automatically get added to the user's friends list. The updates 325 may also include but are not limited to information regarding addition of friends, deletion of friends, invitations, reminders and notifications. In another embodiment, the main page 220 includes a list of messages 330. In one embodiment, the messages may include unread messages received from other users. In another embodiment, the messages 330 include messages from an administrator. In some embodiments one or more messages 330 and updates 325 may include information such as date, time, name of a user, subject and other information as apparent to one skilled in the art. In one embodiment, clicking on a friend's name in the updates 325 or messages 330 sections takes the user to the profile page of the friend. In another embodiment, clicking on a message 330 opens a contacts page that allows the user to communicate with a friend who has sent the message. In one embodiment, the user can communicate with the friend using a messaging system associated with the web based services described herein. In another embodiment, the user can communicate with the friend using email, instant messaging, Voice Over Internet Protocol (VOIP) based communication or any other mode of communication as apparent to one skilled in the art.

In one embodiment, the main page 220 includes one or more hyperlinks 315. In some embodiments, the hyperlinks may include interactive buttons, text, images and other interactive contents. In another embodiment, the hyperlinks provide the user with links to various functionalities including but not limited to sharing a profile of the user, viewing a list of friends and managing the profile. Managing the profile may include viewing and/or updating the profile. In still another embodiment, the main page includes a footer 320 containing one or more hyperlinks to information such as corporate information, copyright and privacy. In yet another embodiment, the main page 220 also includes one or more hyperlinks that allow a user to edit account information and log out of the account. In further embodiments, the main page 220 or any page of the website may include one or more of the following: a smart matcher, a calendar, a list of events, links to one or more chat rooms and instant messaging services, newsfeeds, blog links, e-commerce services such as provided by Amazon.com Inc. of Seattle, Wash. and eBay Inc. of San Jose, Calif., links to dating sites and/or services, online radios and music streaming services such as PANDORA provided by Pandora Media Inc. of Oakland, Calif. and AOL RADIO provided by AOL LLC. Of New York, N.Y., user developed applications developed using any software developer's kit and any other location based web services as apparent to one skilled in the art.

Figure 3C:
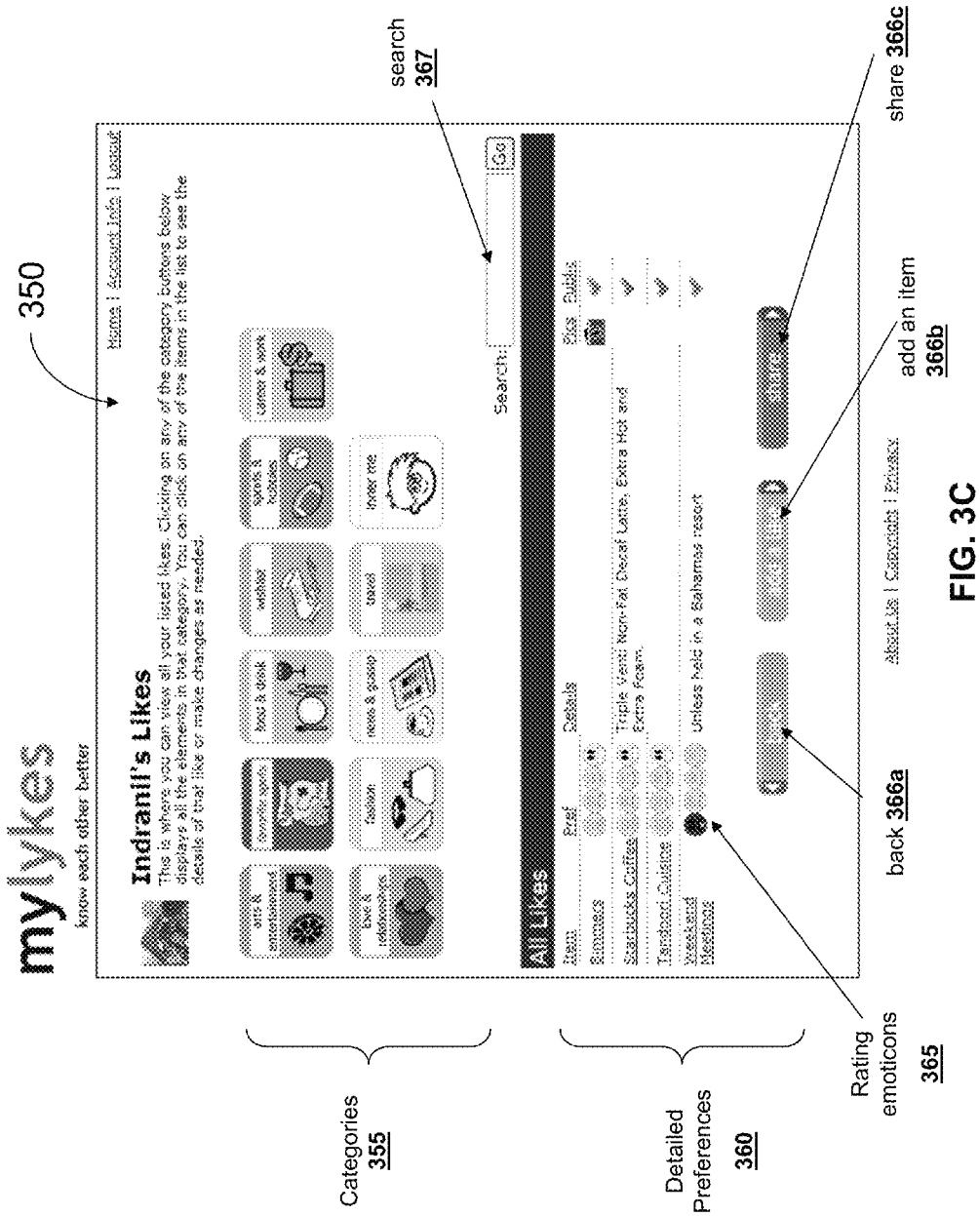

Referring now to FIG. 3C, an embodiment of a webpage 350 to view and update likes and dislikes of a user is shown and described. The likes and dislikes of the user include an indication of a degree of preference of the user for various items classified across categories in a plurality of domains of interest in a taxonomy of preferences. In one embodiment, the webpage 350 includes a list of categories 355 and a detailed description of preferences 360. In another embodiment, the categories 355 may be represented using one or more images. In still another embodiment, the categories 355 represent a broad level classification in a taxonomy used to classify the likes and dislikes of a user. The categories may include but are not limited to the following: arts and entertainments, favorite spots, food and drink, wish list, sports and hobbies, career and work, love and relationship, fashion, news and gossip, travel and personal trivia. In one embodiment, the categories 355 may be divided into one or more subcategories 355' (not shown). In another embodiment, the categories 355 and subcategories 355' may be displayed across a plurality of web pages linked to one another.

Still referring to FIG. 3C, a webpage 350 to view and update the likes and dislikes of the user may include a detailed list of preferences 360. In one embodiment, the detailed preferences 360 lists the likes and dislikes of the user across all categories 355 and subcategories 355'. In another embodiment, the detailed preferences 360 may be classified and displayed using the same taxonomy used for the categories 355. In still another embodiment, any other taxonomy as apparent to one skilled in the art may be used to display the detailed preferences. In one embodiment, the detailed preferences may include one or more of the following attributes: name of an item liked or disliked, degree of preference for the item and other details entered by the user. In another embodiment, the degree of preference is indicated by one of a plurality of rating emoticons 365. In still another embodiment, the detailed preferences may include one or more images of the likes and dislikes. In yet another embodiment, the detailed preferences 360 for an item may include an indication of the level of privacy associated with the item. For example, the user may choose to make an item public such that anyone visiting the profile of the user can see the item and the user's degree of preference for it. In another example, the user may define a group of friends and allow them to view the item. In one embodiment, an attribute of an item may be assigned a different level of privacy from other attributes of the item. For example, the user may allow everyone to see an item and the degree of preference associated with it but only the group of friends to view the picture or image of the item.

A rating emoticon 365 may convey information about the degree of preference of a user for an item in any form. In one embodiment, a rating emoticon may include an image or graphics. In another embodiment, a rating emoticon 365 includes text such as alphanumeric and special characters. In still another embodiment, the rating emoticon 365 may be a combination of graphics and text. In yet another embodiment, a rating emoticon may represent different degrees of preference via any facial expression. In further embodiments, rating emoticons may include one or more of any color, texture, interactive content, shading, image, sound or video. In one embodiment, the text and/or sound associated with a rating emoticon 365 may be in English. In other embodiments, the text and/or sound associated with a rating emoticon 365 may be in any other language. In still other embodiments, the language associated with the emoticons 365 may be changed by one or more of an administrator, a user and an automated service.

In some embodiments, the rating emoticon is designed and constructed to provide an immediate sense of a like or dislike, or the granularity of such. In one embodiment, the rating emoticon is designed and constructed in a manner that provides an immediate impression or interpretation of a level of a like or dislike. In another embodiment, the rating emoticon is designed and constructed to have the level of liking or disliking quickly and easily recognized, interpreted or understood, such as upon view of the emoticon. In one embodiment, the rating emoticon is designed and constructed to provide a visual hint, client or indication upon viewing. In another embodiment, the rating emoticon is designed and constructed to provide a well-known indication of a level of like or dislike. In some embodiments, the rating emoticon is designed and constructed to provide a universally recognized symbol, representation or expression of a human emotion of a level of liking or disliking. In other embodiments, the difference between rating emoticons may provide an immediate sense, impression, interpretation or understanding of the different or of a degree of difference between the rating emoticons. For example, the degree of visual difference between ratings emoticon corresponds to the degree of difference between ratings. In some embodiments, the rating emoticons are designed and constructed so that peer uses may easily and/or quickly identify via visual review or view a like or dislike and/or granularity of like or dislike of another user.

In one embodiment, a rating emoticon 365 may indicate one of the following degrees of preference: love it, really like it, like it, unsure, dislike it, really dislike it and hate it. It can be appreciated that any number and granularity of degrees of preference may be chosen depending on the item, category or subcategory. For example a particular food item may require more granularity and/or higher number of emoticons for a wide section of users to rate while political orientation of being a democrat or republican may be accurately indicated by a binary choice. In one embodiment, a distinct and separate emoticon may be used to represent each level of granularity or degree of preference. In another embodiment, levels of granularity or degrees of preference may be represented via changes to substantially same or similar emoticons. In still another embodiment a numerical rating system may be used to indicate the degrees of preference. In yet other embodiments, the levels of granularity or degrees of preference may be represented by one or more of text, sound, speech, video or images.

In one embodiment, the webpage 350 to view and update the likes and dislikes includes one or more hyperlinks 366 to go back to the previous page (366a), add an item (366b) and share one or more items (366c). In one embodiment, the hyperlink to add an item 366b takes the user to a page that allows to create and edit properties and/or attributes of a new item. In another embodiment, the hyperlink to share 366c allows the user to share one or more items and their attributes with one or more users and friends. In still another embodiment, the webpage 350 to view and update the likes and dislikes includes a search feature to search for an item, category, subcategory or attribute among a list of items for the user.

Figure 3D:
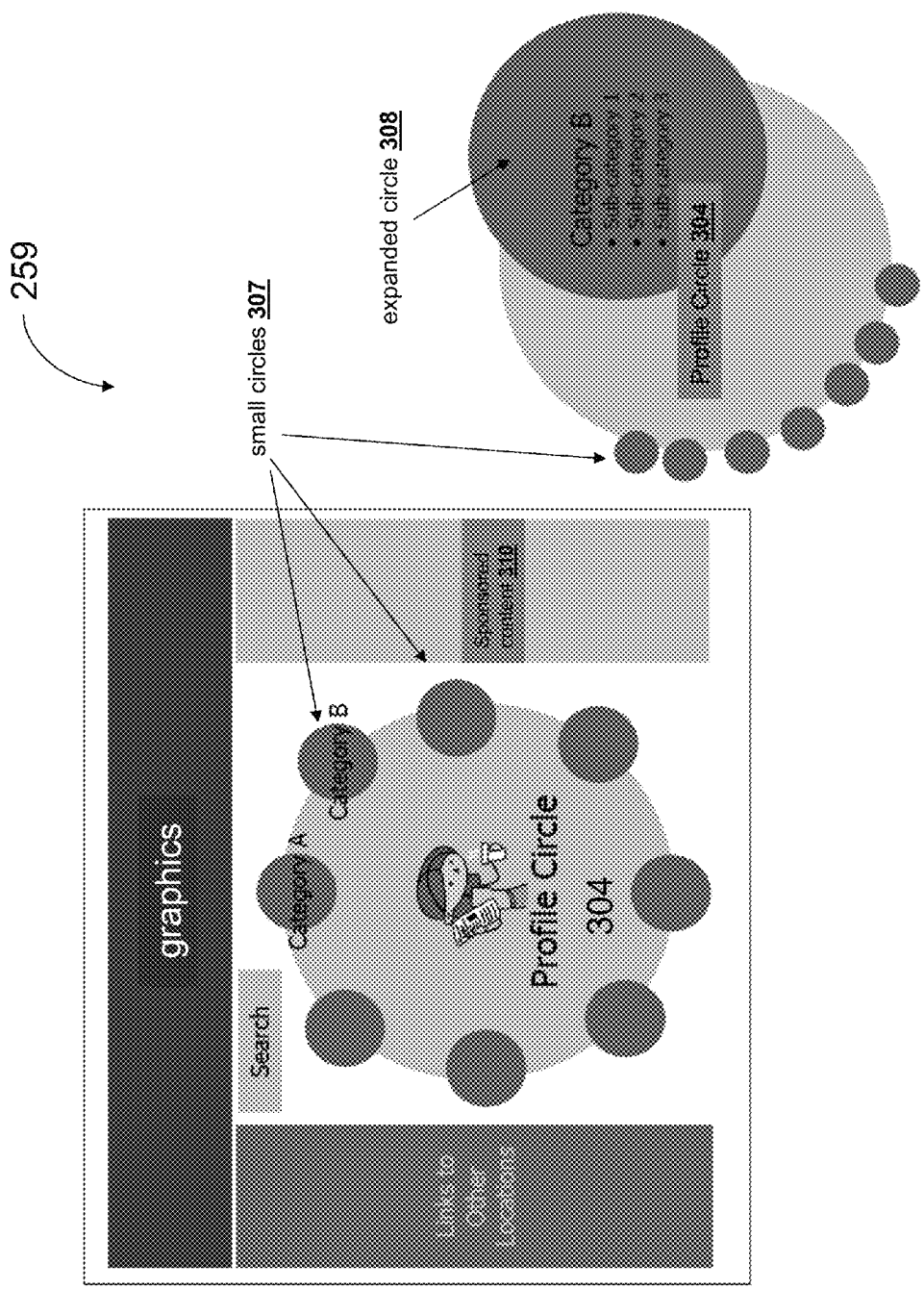

FIG. 3D shows an embodiment of a webpage 259 to access a category viewer and editor. In one embodiment, a user is able to access the category viewer page 259 of his or her own profile from the webpage 350. In another embodiment, the category viewer page 259 is accessed from the main page 220 and provides a link to the webpage 350. In still another embodiment, the category viewer 259 for another user is accessed from the profile viewer page 258 of the profile of the another user. In one embodiment, the category viewer 259 includes a profile circle 304 to display the categories 355 and subcategories 355'. In another embodiment, the profile circle 304 is an animated display consisting of one or more small static or moving circles 307 around a larger profile circle 304. In still another embodiment, the small circles 307 each represent a different category 355. In yet another embodiment, one or more of the profile circle 304 and small circles 307 are created using any animation or interactive software such as Flash. In one embodiment, when a mouse pointer is placed or clicked over a small circle 307, the small circle 307 blows up to form an expanded circle 308. In another embodiment, the expanded circle 308 includes names and/or hyperlinks to one or more subcategories 355' within that category 355. In still another embodiment, the subcategories are displayed as small static or moving circles 307' (not shown) around the expanded circle 308. In yet another embodiment, when one small circle 307 is blown up to form an expanded circle 308, the other small circles contract to form circles with smaller areas. In further embodiments, the category viewer 259 includes one or more of links to other locations within or outside the website, graphics and other content as apparent to one skilled in the art. In one embodiment, the category viewer may include sponsored content 310. In another embodiment, the sponsored content is dynamically changed in accordance with the category 355 selected or highlighted. Even though FIG. 3D depicts the category viewer 351 with respect to circular shapes, it can be appreciated that any shape of any size may be used to implement the category viewer 351. Similarly, even though highlighting one category 355 is shown and described with respect to expanding and contracting circles, any other form of animation and display method can be used.

Figure 3E:
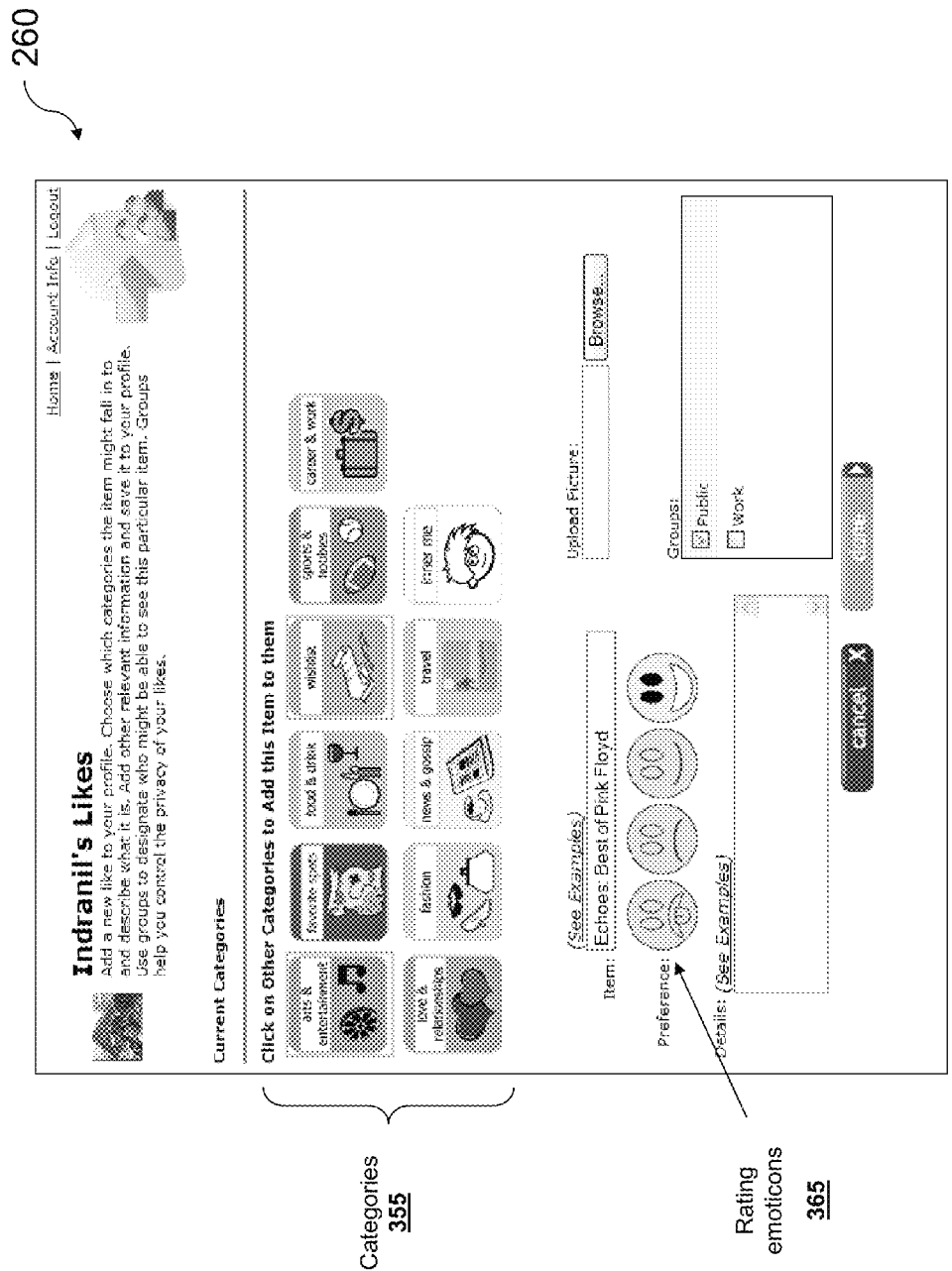
Figure 3F:
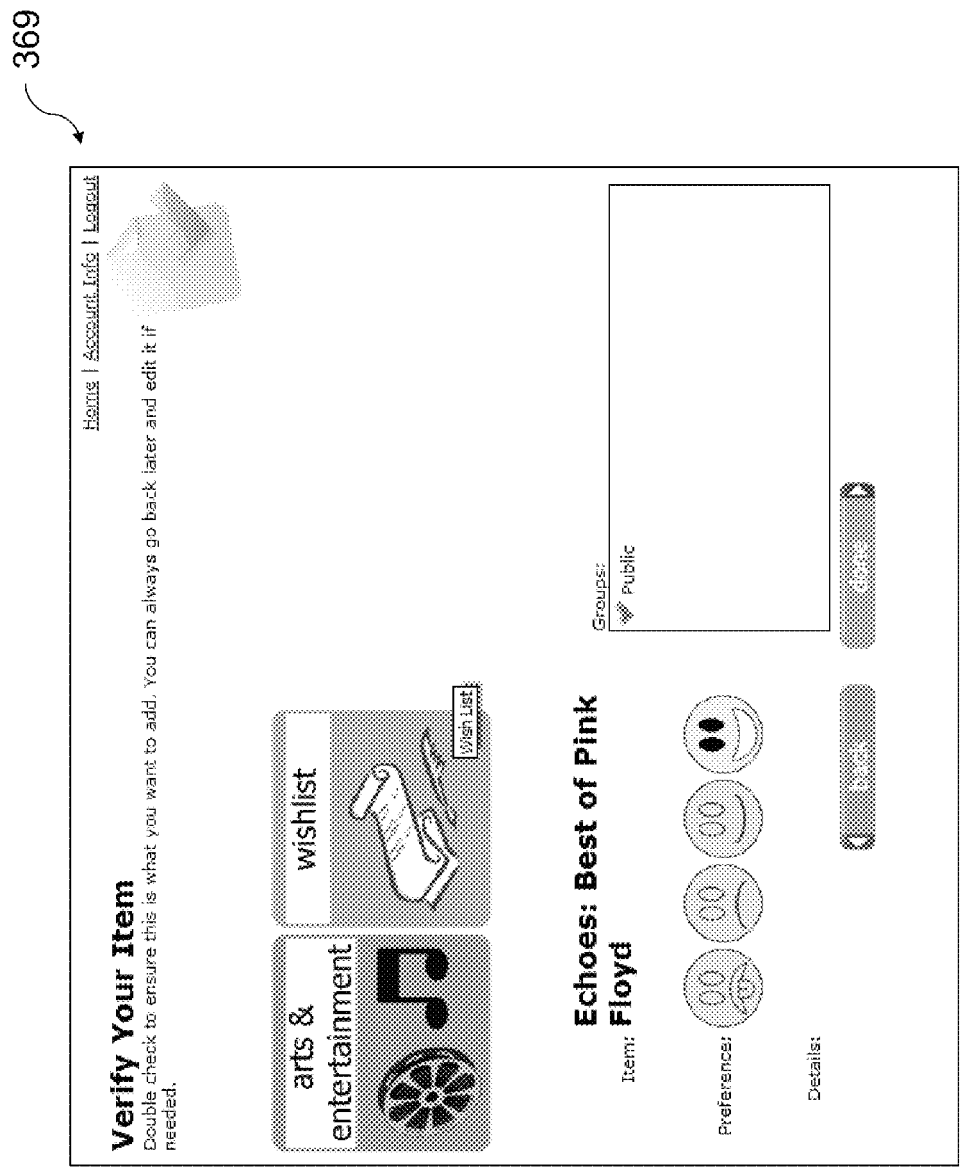
Figure 3H:
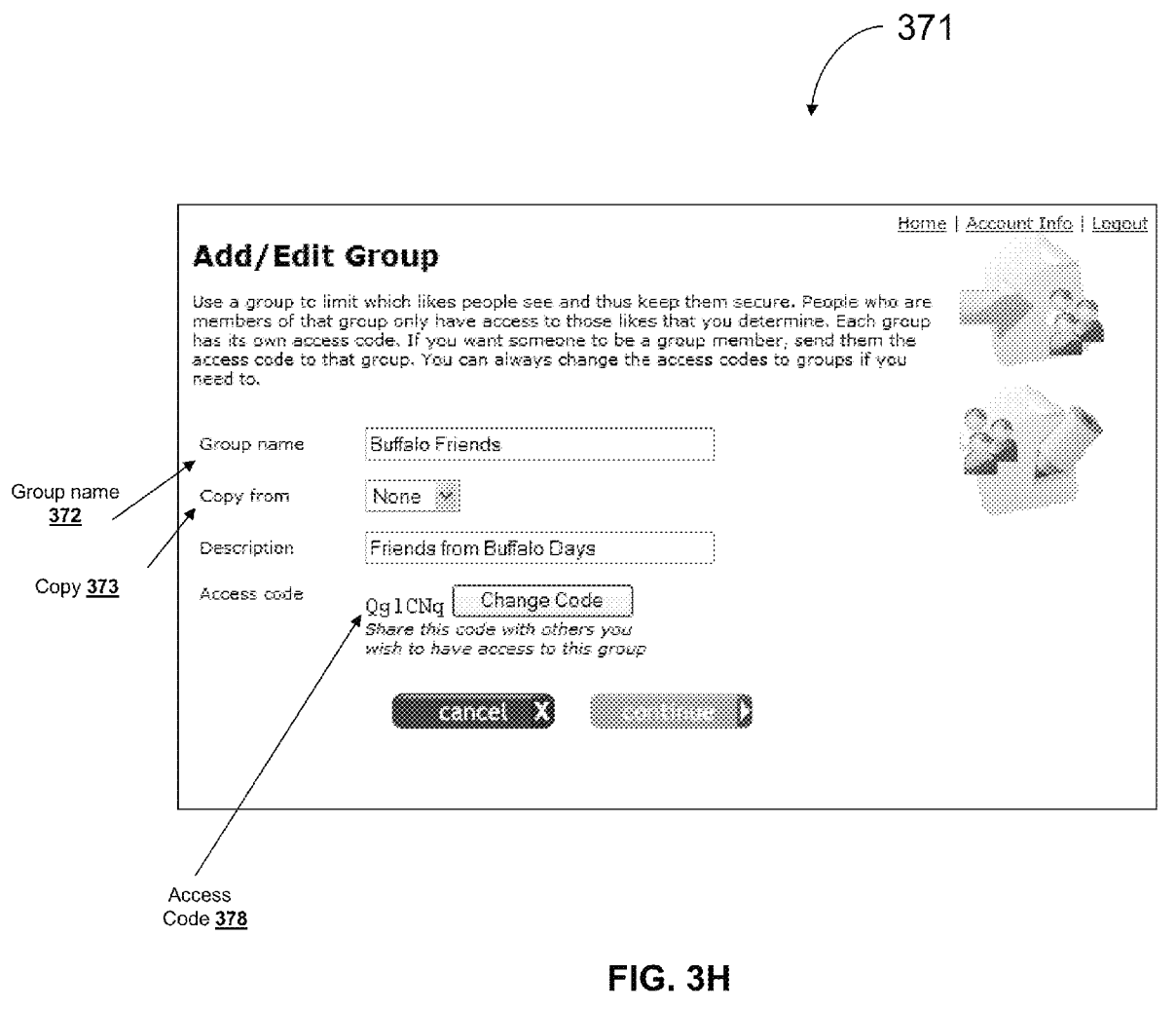

Referring now to FIG. 3E, a profile editor 260 to add and/or edit an item is shown and described. In one embodiment, the profile editor 260 may be launched on clicking the hyperlink 366b on the webpage 350. In another embodiment, a user can enter details about a new item and related attributes via the profile editor 260. In one embodiment, the details include but are not limited to a name of the item, a degree of preference and user entered details. In another embodiment, the user can choose a picture or an image to upload with the item. In still another embodiment, the user can control the privacy of the item by selecting a user defined group associated with the item. In yet another embodiment, the default group for any item allows all users to access the item and related attributes. The degree of preference can be selected by selecting a rating emoticon 365. In a further embodiments, the number and appearance of emoticons may vary from one category 355 and/or subcategory 355' to another. In one embodiment, an item can be associated with one or more categories 355. As shown in FIG. 3E, an item: "Echoes: Best of Pink Floyd" can be categorized under arts and entertainment as it is a music album. The item can also be categorized under wish list 245 such that another user planning to buy a gift for the user will know that the user desires to have the album. In one embodiment, the profile editor 260 features a hyperlink each to cancel or confirm entries. Canceling clears the entries on the profile editor 260 and confirming takes the user to a confirmation webpage 369 as shown in FIG. 3F. The webpage 369 allows the user to review the details of the new item and add it to the database 165. The user can also go back and edit one or more attributes of the item. In one embodiment, the profile editor 260 allows a user to edit or delete am item. In this embodiment, the profile editor 260 includes a checkbox for each item which allows the user to delete the item. In another embodiment, when a checkbox for an item is chosen and a hyperlink confirming deletion is clicked, the item is deleted from the user's profile. In still another embodiment, a page confirming that the item has been deleted is shown and the user is taken back to the webpage 350.

Referring now to FIG. 3G, a friend's list 235 identifies, enumerates or otherwise lists the details about friends 375 and contacts of a user. In another embodiment, the details include but are not limited to name of the friend or contact, group that the friend belongs to, last update or action with respect to the friend, date of last update and a list of actions that can be initiated with the friend. In still other embodiments, the actions include sending a message to the friend, editing attributes related to the friend and deleting or removing the friend from the list. In one embodiment, the friend's list 235 allows the user to add new friends to the list. In another embodiment, the friend's list 235 allows the user to control the privacy of the user's profile by creating and editing groups. In still another embodiment, the friend's list 235 includes hyperlinks 315 to add new friends and/or edit group settings.

In one embodiment, one or more name in the list of friends 375 are hyperlinked. In another embodiment, clicking the hyperlink takes the user to a profile access page of the friend. The profile access page may have an appearance depending on the status of the friend. In one embodiment, the friend is a member or registered user of the web based services described herein and has shared his or her profile with the user. In this embodiment, the profile access page of the friend includes a hyperlink to a profile viewer page 258 containing more details on the friend including details on items liked and disliked by the friend. The user can browse the items as they would if they visited the profile viewer page 258 from an email invitation 257. In another embodiment, the friend is a member or registered user by has not shared his or her profile with the user. In this embodiment, the profile access page of the friend includes a notification that the profile viewer page 258 of the friend containing details on items of his or her dislike is not available to the user. In this embodiment, the profile access page may include a hyperlink to request the friend to share his or her items of like and dislike with the user. In still another embodiment, the friend is not a member or registered user of the web based services described herein. In this embodiment, the profile access page includes a notification that the webpage 350 of the friend containing details on items of his or her dislike is not available to the user. In yet other embodiments, the profile access page includes a hyperlink to send messages to the friend irrespective of whether he or she is a member or registered user.

Adding or editing groups allows a user to control the privacy and visibility of the user's profile or any part thereof. For example, the user may wish to hide certain items in the profile from the user's contacts or friends from the workplace. In another example, the user may wish to grant access to one or more items only to a selected set of friends. In one embodiment, a webpage 371 allows the user to add a new group or edit settings and other attributes of an existing group. In another embodiment, a new group can be created using a group name 372. In another embodiment a group can be automatically configured using the copy field 373. The copy field 373 allows the user to choose an existing group from which to copy the items associated with the existing group. Choosing an existing group pre-populates the new group with the same permissions as the existing group. In still another embodiment, the user is allowed to add a description associated with the new group.

The access code 378 can be any combination of characters, numerals and alphabet that is used for controlling access to one or more profiles. In one embodiment, a unique access code 378 is generated for sharing the user's profile with other users and non-users. Non-users refer to individuals who do not subscribe to the web based services described herein but can view a profile of a user when in possession of a access code 378. In another embodiment, the access code 378 is a combination of alphanumeric characters and special symbols and can be of any length. In still another embodiment, the rights and permissions of a given group is identified uniquely by the access code 378 associated with the group. In yet another embodiment, an access code 378 can be changed and/or a new access code 378 can be generated by the user via an interactive button on the webpage 371. In further embodiments, each group created by the user has a unique access code 378.

In one embodiment, a webpage 374 displays a list of groups associated with a user's profile. In another embodiment, the list displays one or more details about the groups including but not limited to the name of the group, date of creation, time of creation, number of friends and/or contacts associated with the group, date and/or time of last activity in the group, nature of the last activity and the access code 378 associated with the group. In still another embodiment, the webpage 374 includes one or more hyperlinks to edit and/or delete a group. In a further embodiment, the webpage 374 may have hyperlinks to navigate to other pages of the website such as the friends list 235 and the webpage 371 to add/edit a group.

Figure 3J:
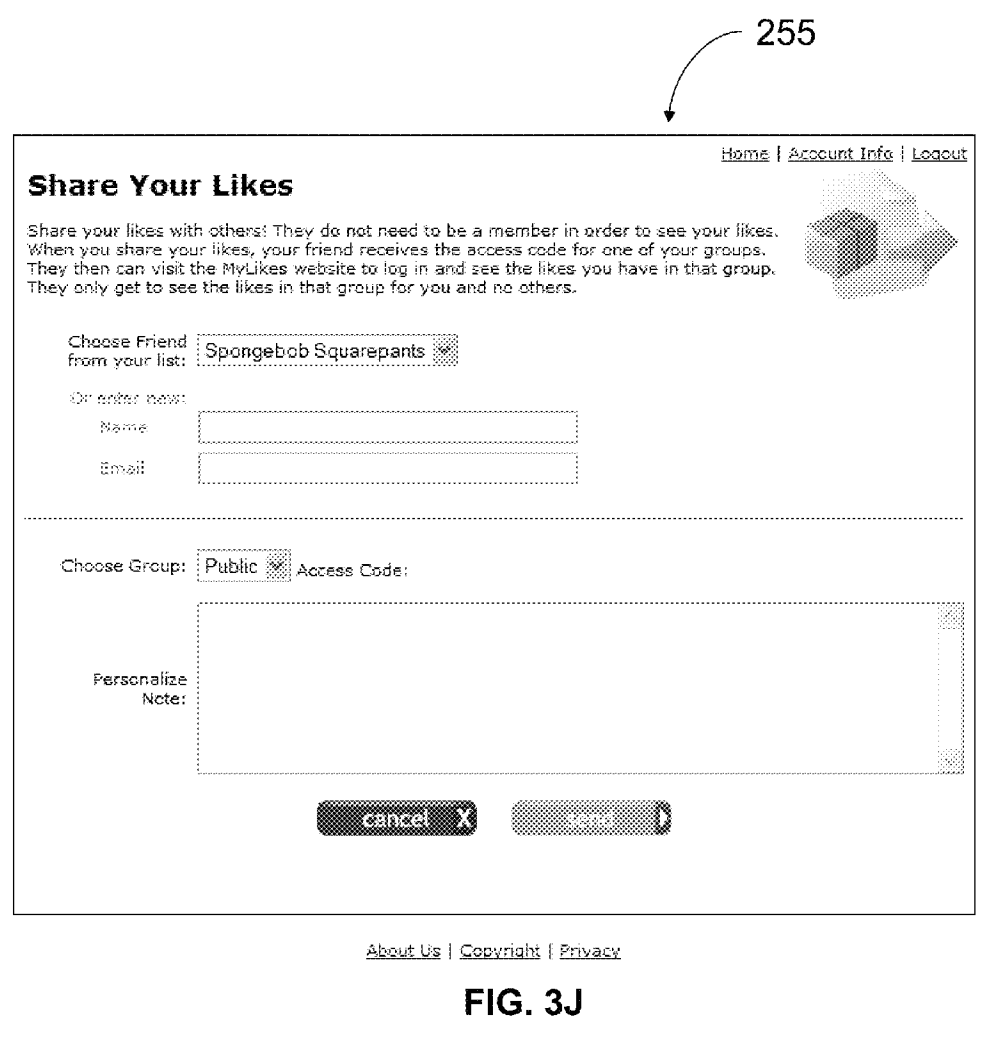

Referring now to FIG. 3J, an embodiment of a package and send webpage 255 is shown and described. The package and send webpage 255 allows a user to share one or more items from the user's profile with other users and/or non-users. In one embodiment, information entered by the user about an individual via the package and send webpage 255 is used to send an invitation to the individual to view the profile of the user. In another embodiment, the invitation is sent to an account of the individual if the individual is a user of the web based services described herein. In other embodiments, the invitation is sent using email or other modes electronic communication as apparent to one skilled in the art. In one embodiment, the package and send webpage 255 allows the user to choose who the profile is sent to. In another embodiment, the user selects the individual from a drop down menu or manually enters contact information for the individual in one or more fields on the webpage 255. In still another embodiment, the user is allowed to select a group associated with the invitation. Selecting a group prepopulates the invitation with the permissions associated with the selected group and locks the invitee to the permission levels of the selected group. In yet another embodiment, a new contact is added to the friends list of the user. In a further embodiment, the access code 378 associated with the selected group is displayed on the package and send webpage 255.

Figure 3K:
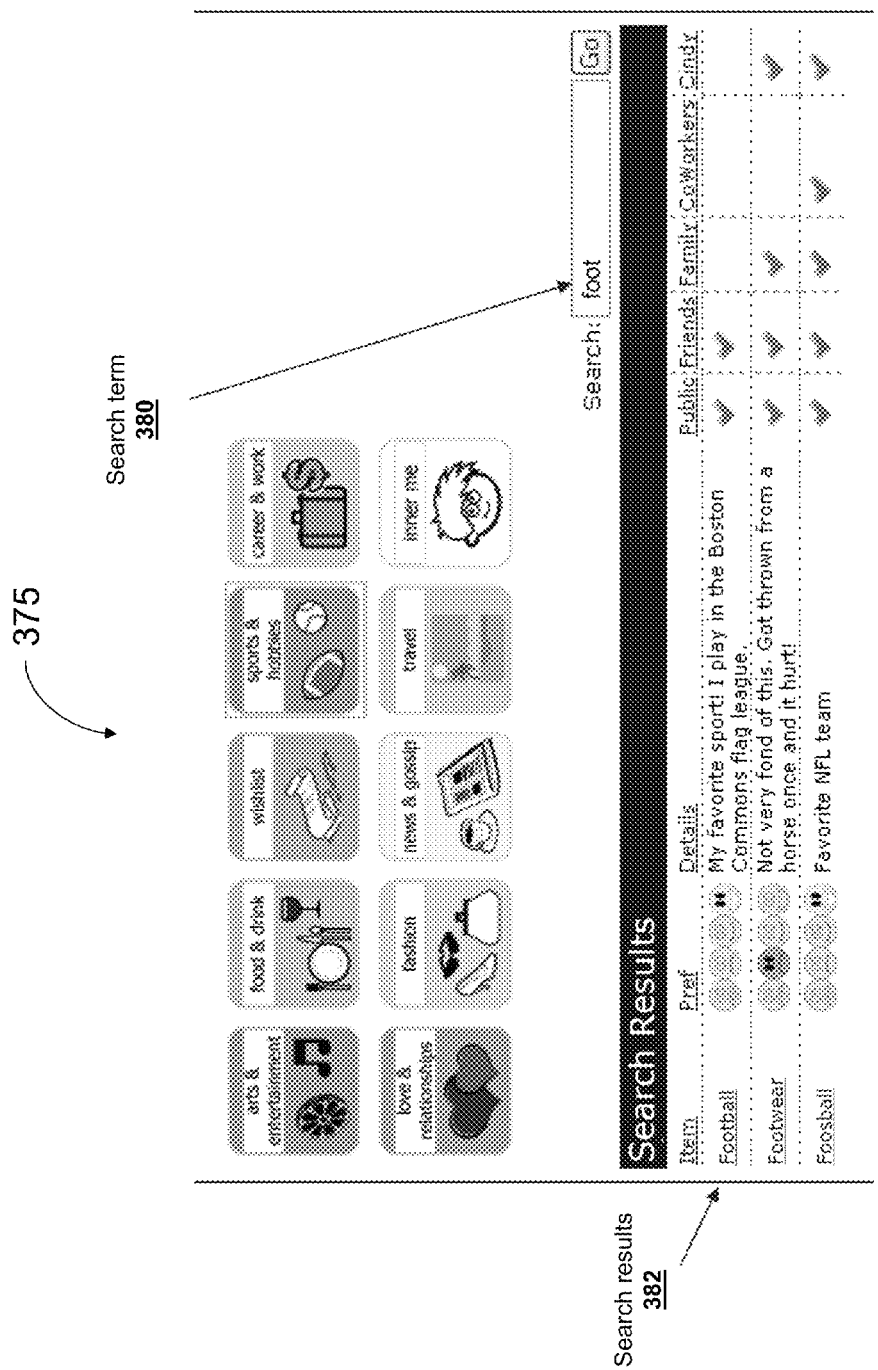
Figure 4A:
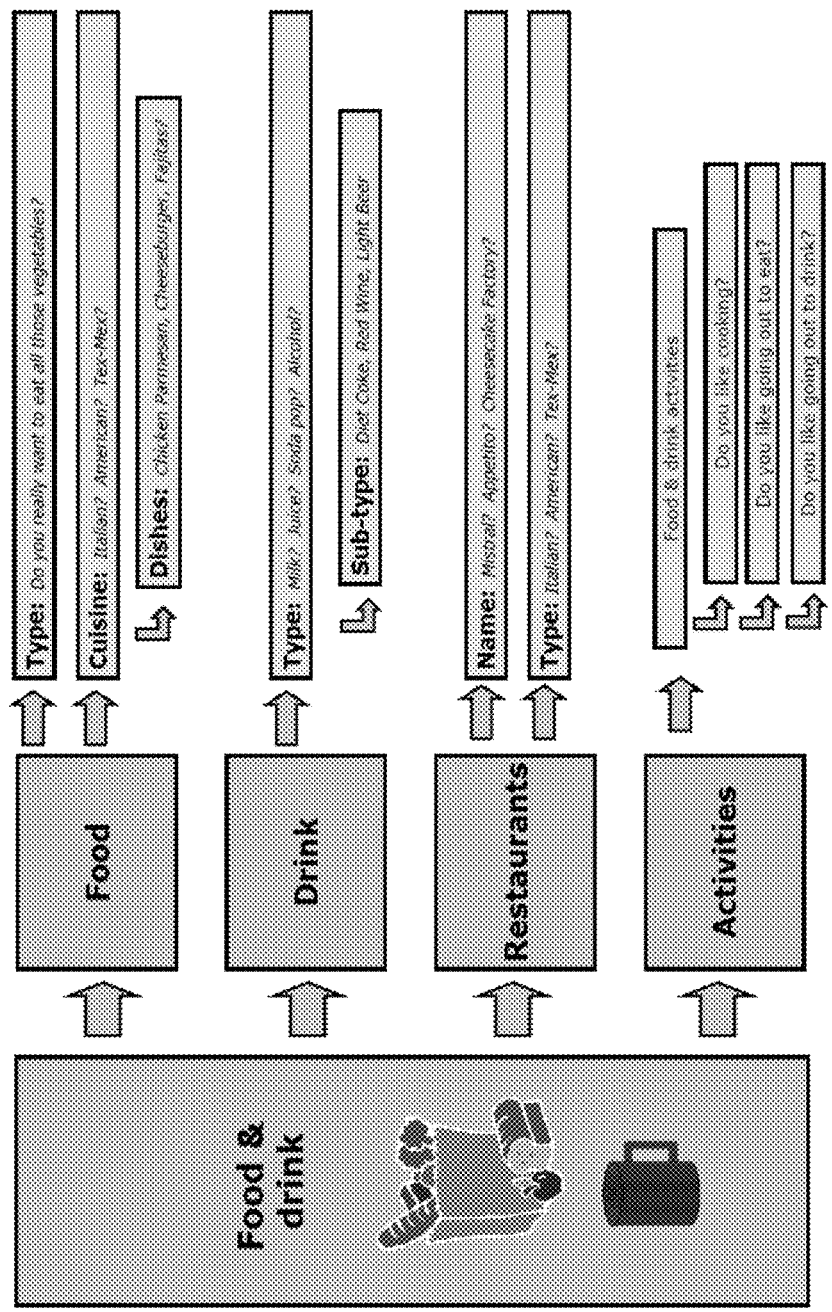
FIGS. 4A-4F are examples of domains of interest in a taxonomy of preferences used in creating the user profiles.
Figure 4B:
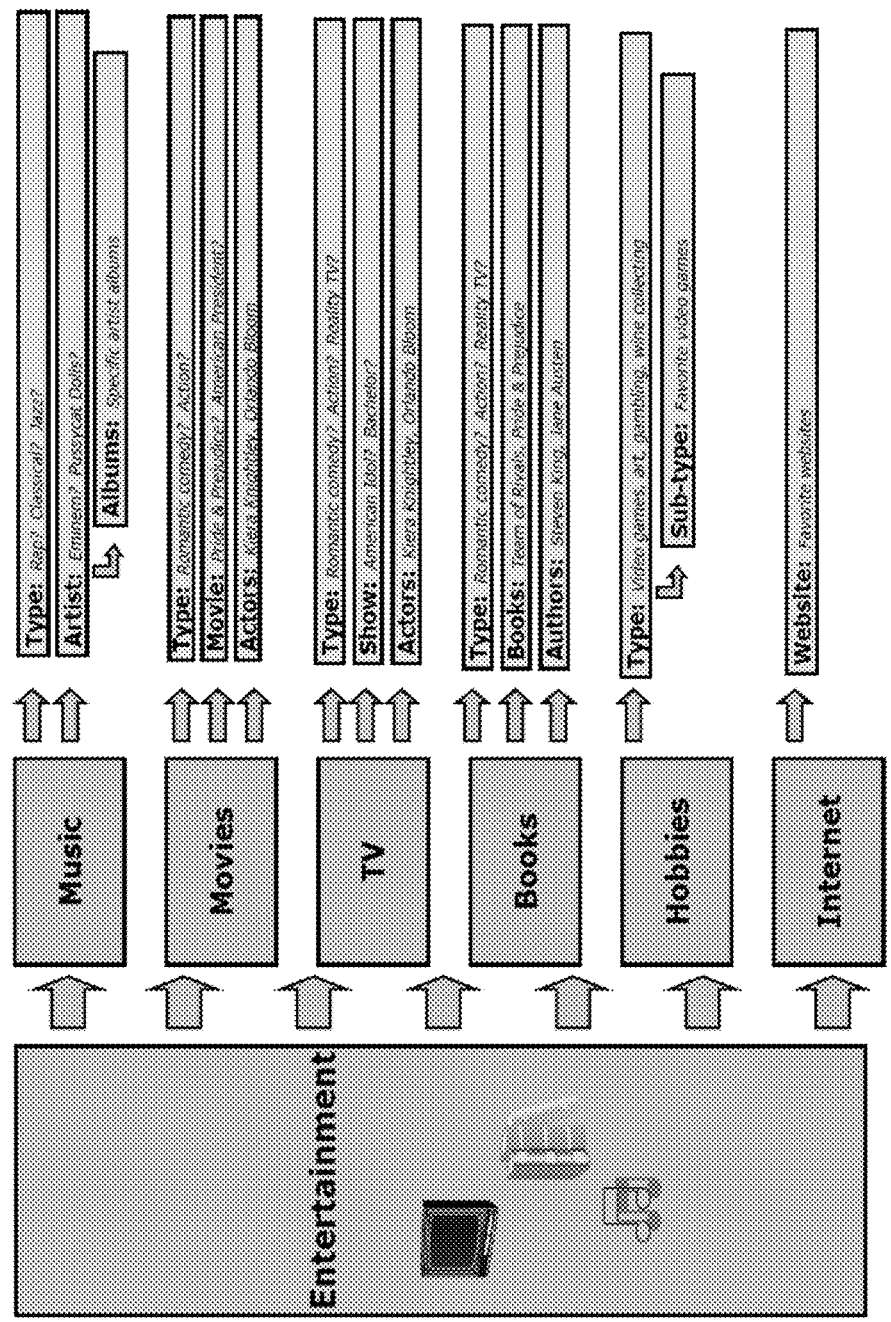
Figure 4C:
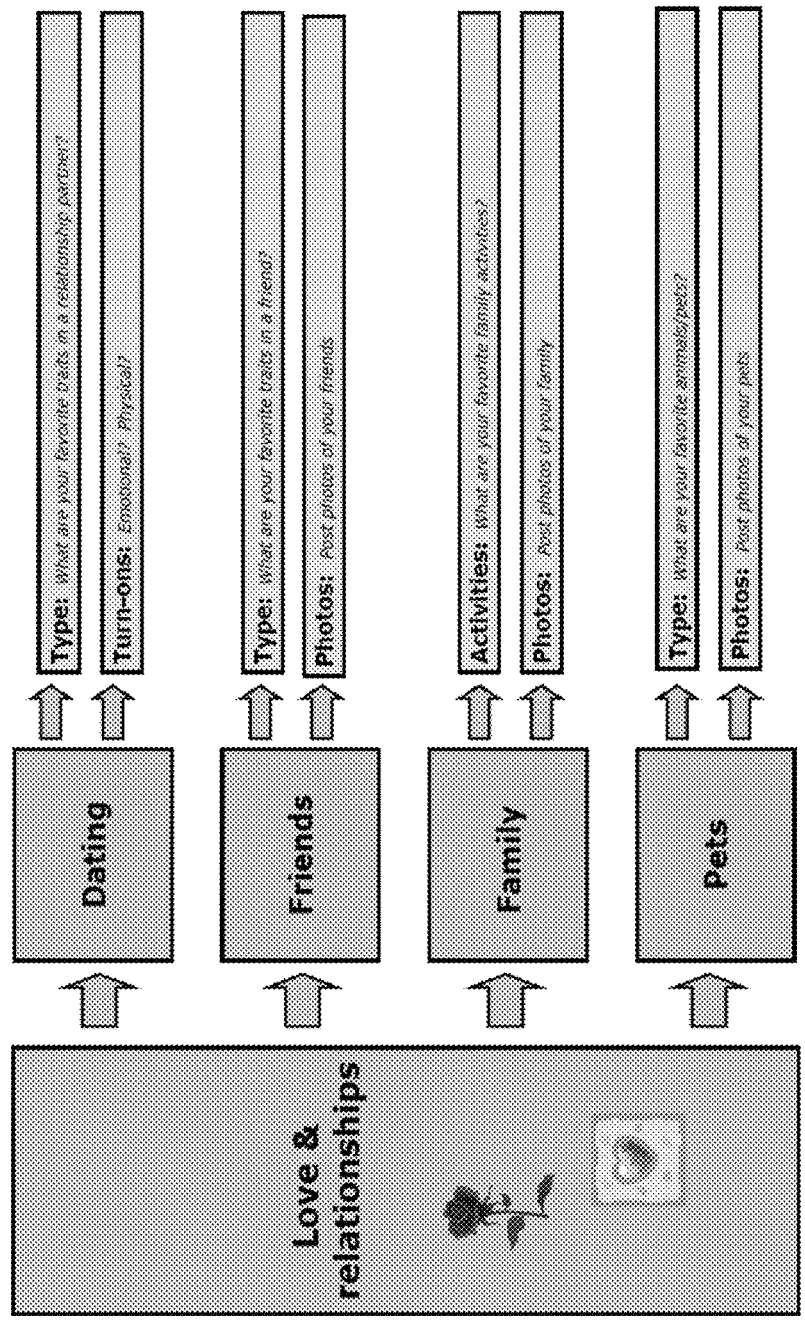
Figure 4D:
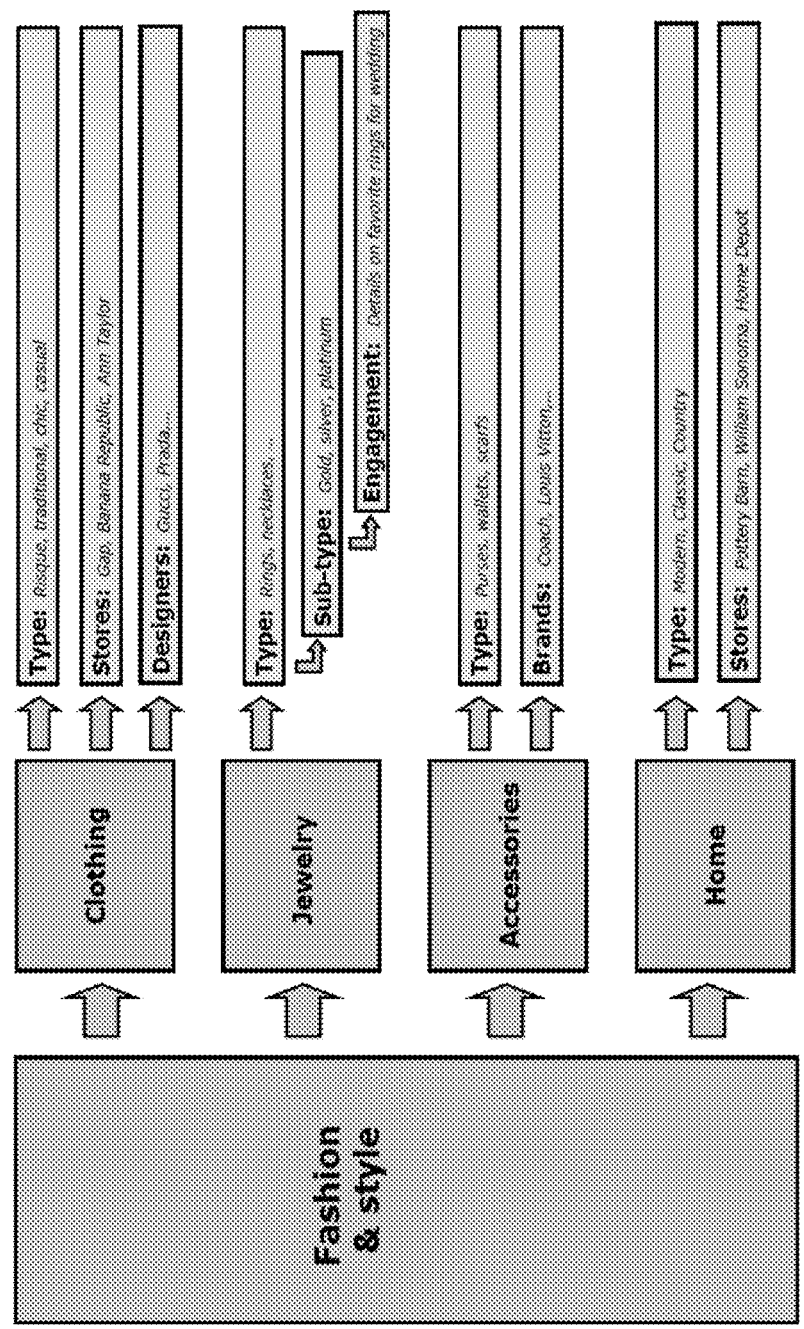
Figure 4E:
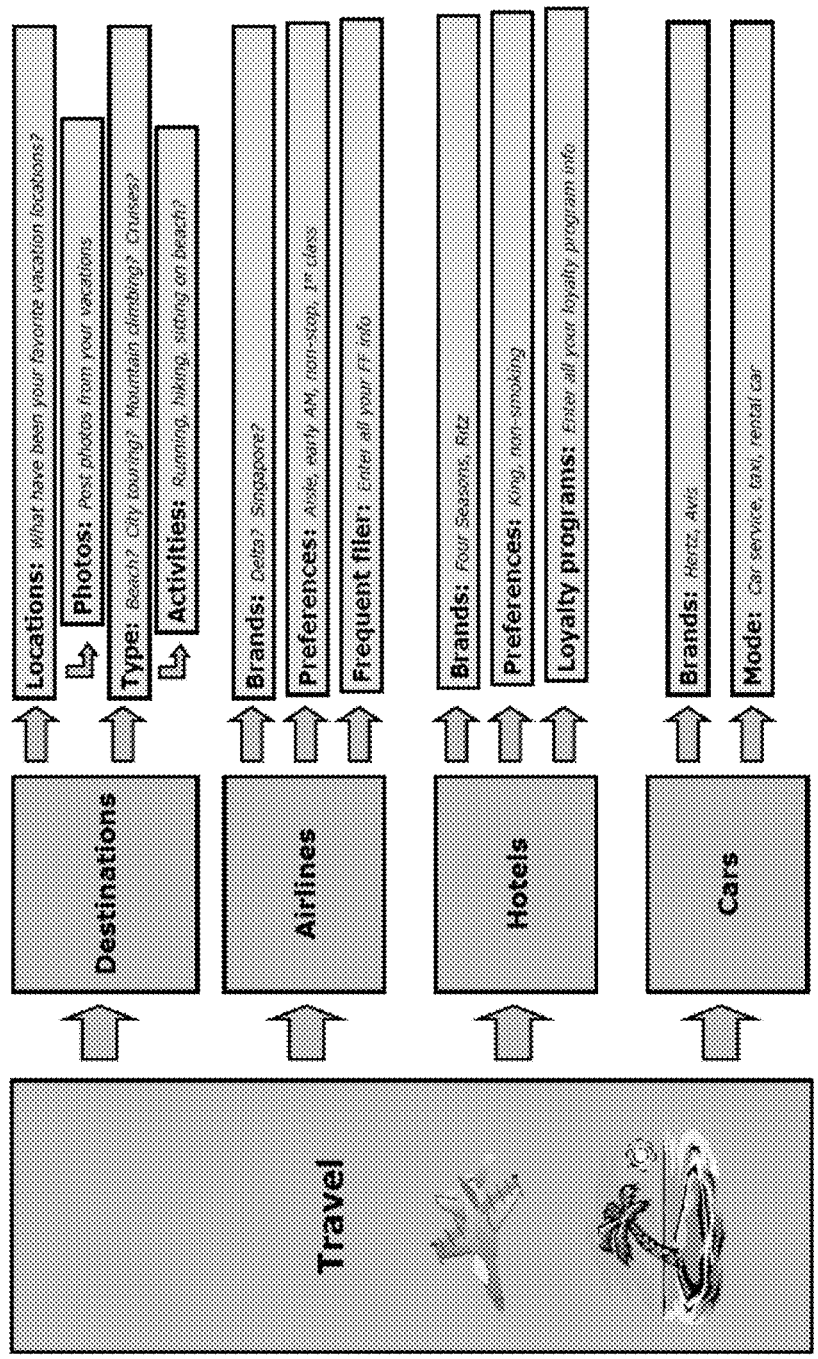
Figure 4F:
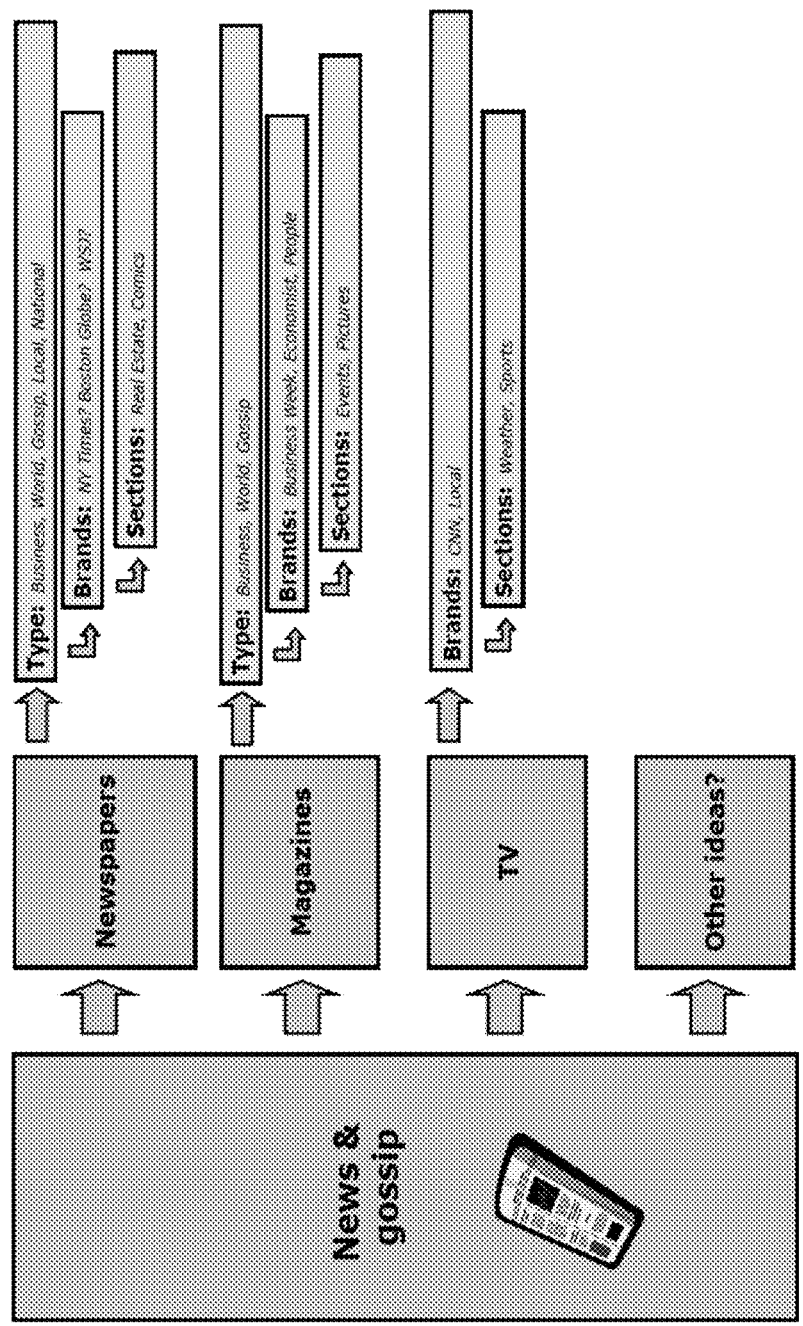

Referring now to FIG. 3K, a search page 375 to conduct searched through a profile of a user is shown and described. In one embodiment, the search page can be used by a user to search through profile items of one or more other users. In another embodiment, the user may use the search page to find one or more items in his or her own profile. In still another embodiment, search results 382 are listed in a way substantially similar to the detailed preferences 360 as described with reference to FIG. 3C. In yet another embodiment, the search page 375 includes a search field 380. On or more search terms and keywords may be entered into the search field. In one embodiment, the search may be implemented as a part of the system providing the web based services described herein. In another embodiment, search methods and techniques from a third party vendor such as Google Inc. of Mountain View, Calif., Yahoo! Inc. of Sunnyvale, Calif. or Cuil Inc. of Menlo Park, Calif. may be incorporated into the system. Any search algorithm, tool, technique or software as apparent to one skilled in the art may be used to implement the search functionality. In yet another embodiment, the search page includes a listing of one or more categories 355. In a further embodiment, one or more categories may be selected as search criteria. In one embodiment, the number of search results 382 displayed may be delimited by a preference indicated by a user.

One or more items in a user's profile may be classified into categories and/or subcategories using any type and form of taxonomy. Referring now to FIGS. 4A-4F, example embodiments of the taxonomy used to classify items in a user's profile is shown and described. In one embodiment, an item can be classified using a coarse granularity of the taxonomy. As an example, an edible item can be classified as "food and drink". In another embodiment, finer granularity can be employed in order to bring out more specific details on the item. As another example, a drink can be classified as a "drink" under the category "food and drink." In still another embodiment, further details on the drink can be specified such as whether the drink is milk, juice, soda pop or alcohol. In yet another embodiment, even more specific details can be specified. As yet another example, if the drink is a soda pop, the brand and type of the drink can be specified. In one embodiment, the taxonomy may be hierarchical. In another embodiment, the taxonomy may include one or more domains of interest. In still another embodiment, one or more domains of interest may include one or more categories. In yet another embodiment, a category may include one or more subcategories. In further embodiments, a subcategory may include further subcategories and/or details. The categories and subcategories may be distributed within the taxonomy in any form and distribution. In one embodiment, a category may be included in one or more domains of interest. In another embodiment, a subcategory may be included in one or more categories in one or more domains of interest. In still another embodiment, a domain of interest may be a category and/or a subcategory. In yet another embodiment, a category in one domain of interest may be a subcategory in a different domain of interest.

It can be appreciated that a user's degree of preference for one or more items across categories in a plurality of domains of interest in the taxonomy of preferences can be specified as mentioned above. As shown in FIGS. 4A-4F, the taxonomy can include any domain of interest, category and/or subcategory such as food and drinks, entertainment, love and relationships, fashion and style, travel, news and gossip. In one embodiment, one or more items are classified in a domain, a category and/or a subcategory in the taxonomy. In another embodiment, the user's degree of preference for the item is identified. In still another embodiment, the user's degree of preference for an item is stored in a profile of the user. In yet other embodiments, the profile identifies preferences of the user in a taxonomy of preferences across categories in a plurality of domains of interest. In one embodiment, a plurality of categories in the taxonomy may have one or more common subcategories. In another embodiment, a number of levels of subcategories for one category may be different from the a number of levels of subcategories for another category. In still another embodiment, the granularity of the taxonomy may be defined by a user. In yet another embodiment, the granularity of the taxonomy may vary from one user to another.

The taxonomy may include any domain, category or subcategory for listing likes and dislikes of a user for one or more items. As an example, "Food and Drink" may be a domain of interest. The domain "Food and Drink" may include categories such as food, drink, restaurants and activities. Food may include further subcategories and/or details such as a preference for vegetables or cuisines. Cuisines may include further details on one or more dishes and recipes. The category drink may include a category for type of drink such as milk, juice, soda pop and alcohol. Each of the types may include one or more subcategories indicating sub-types and/or brands such as Diet COKE, red wine and light beer. The restaurants category may include subcategories such as names and cuisine types. The activities category may include subcategories listing details on likes or dislikes for food and drink related activities such as cooking, going out to eat, grilling and going out to drink. "Entertainment" may be a domain of interest in the taxonomy. The domain "Entertainment" may include categories including but not limited to music, movies, TV, books, hobbies and internet. Each of these may have subcategories such as type, artist, name of book/movie/TV show/video game, authors, actors, directors, albums and websites. "Love and Relationship" can be a domain of interest including categories such as dating, friends, family and pets. Subcategories for these categories may include details, photos, favorite activities, turn-ons, turn-offs, favorite traits, passions and favorite dating spots. Domains of interest may include "Fashion and Style" with categories including but not limited to clothing, jewelry, accessories, shoes and home décor. Further details about these categories may be included in subcategories such as types of clothing/shoes/style/accessories, favorite stores, stores not preferred and brands. "Travel" may be included as a domain of interest in the taxonomy. Categories for travel may include favorite destinations, airlines, hotels, cars and cruise lines. Subcategories may include locations, type of destinations, activities, name of airlines/cruise line/car rental company, name of hotel chain, seating preference in flights and frequent flyer information. "News and Gossip" can be a domain of interest including categories such as newspapers, magazines, TV and internet. One or more of brands, newspaper names, publishing houses, websites, type of news/gossip, magazine names and sections may be included as subcategories. It can be appreciated that any category and/or subcategory mentioned in the example above may be a domain of interest in a different taxonomy. In another embodiment, a category in a domain of interest may be a subcategory in another domain of interest. In still another embodiment, a category and/or subcategory may be included in more than one domains of interest.

In some embodiments, a system level user or administrator may establish, set, create, generate, change, edit and/or modify any portion of the taxonomy, including a domain of interest, category, and sub-category. In one embodiment, the system provides a template for a taxonomy with a predetermined set of one or more domains of interest, categories and subcategories. In other embodiments, users of the system may generate, create or provide any portion of the taxonomy. For example, portions of the taxonomy may be established or created by user generated content. In some embodiments, the users of the system dynamically generate the taxonomy as the system is used, such as an adhoc basis. In another embodiment, the taxonomy and any portion therefore is created, developed or formed by a combination of a predetermined taxonomy and dynamically creation of portions of the taxonomy via user generation.

Figure 5:
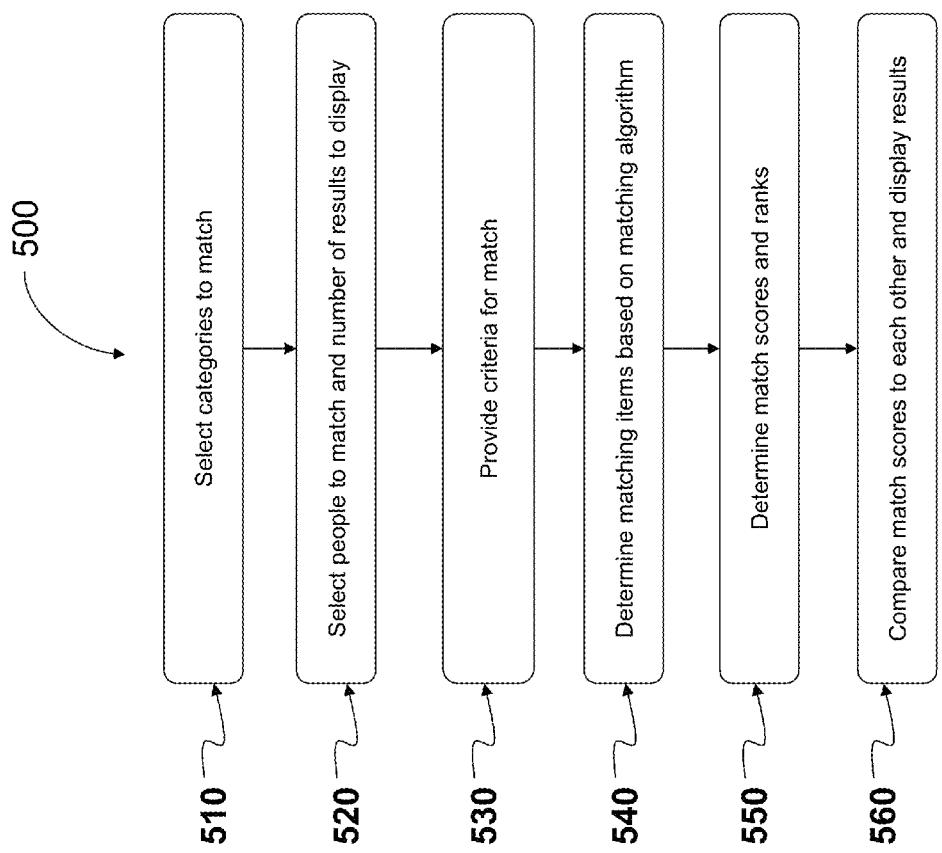
FIG. 5 is a flow diagram depicting steps of an embodiment of a method for providing matches based on one or more matching criteria entered by a user.

Referring now to FIG. 5, a flow diagram depicting steps of an embodiment of a method 500 for providing matches based on one or more matching criteria entered by a user is shown and described. In brief overview, a user selects (step 510) categories to match as one of the matching criteria. The user further selects (step 520) people to match and/or the number of results to display and provides (step 530) one or more criteria for match. Matching items are determined (step 540) based on a matching algorithm. Match scores and rank are determined (step 550) which are compared (step 560) to each other and results are displayed.

Selecting (step 510) categories for match can be done in many ways. In one embodiment, only one category is selected for matching. In another embodiment, a plurality of categories is selected for matching. In still another embodiment, a level of granularity can be specified by selecting one or more levels of subcategories under a given category or subcategory. In one embodiment, the selection is done by a user. In another embodiment, the selection is done by an automated program, or application. In still another embodiment, the selection is done using a third party service 191.

Individuals or users among whom matching is to be done may be selected (step 520) in a plurality of ways. In one embodiment, a user selects the individuals for matching. In another embodiment, the selection is done by an automated system. In one embodiment, the user may individually select one or more friends and/or users as a match criterion. In another embodiment, the user may select a group to include all users and/or non users associated with the group. In still another embodiment, the user may select himself or herself in order to find other users with substantially similar items and/or profiles. In yet another embodiment, when the user selects himself or herself, the user's items are used as key items to match against. In a further embodiment, when the user does not select himself/herself, the items associated with the first person in the list of chosen people are used as the key items to match against. In another embodiment, the user may specify the person whose items are used as the key items.

The user may provide (step 530) one or more criteria for the matching process. In some embodiments, the categories and people are enough to specify the search criteria and hence the step 530 may be optional. In one embodiment, any criterion may be provided as a criterion for match. Examples of such criteria include but are not limited to keywords, level of preference, minimum match score, rank and any other criteria as apparent to one skilled in the art. In another embodiment, the matching criteria may be provided based on one or more emoticons. In still another embodiment, one or more portions of the taxonomy are identified as the matching criteria. In yet other embodiments, one or more predetermined templates based on one or more domains, categories or subcategories are used for providing the matching criteria.

Matching items are determined (step 540) in a plurality of possible ways. One or more matching algorithms, software and techniques may be used in determining a match. In one embodiment, text matching of item names associated with different users is conducted using one or more text matching algorithms. In another embodiment, items from a plurality of users are compared for matching. In still another embodiment, algorithms such as AGREP (Approximate GREP) are used to implement the text matching. In other embodiments any string searching algorithm as apparent to one skilled in the art may be used for the text matching. Examples of such algorithms include but are not limited to naïve string search, Rabin-Karp string search, finite state automata based search, Knuth-Morris-Pratt algorithm, Boyer-Moore algorithm, Aho-Corasick algorithm, Commentz-Walter algorithm and bitmap algorithm. In some embodiments, the matching may be based on one or more statistical measures such as Levenshtein distance, Hamming distance, Damerau-Levenshtein distance, Kullback-Leibler distance and any other statistical measure as apparent to one skilled in the art. In one embodiment, a match is determined based on the statistical measures for one or more items being within a predetermined limit to each other. In another embodiment, a match is determined based on one or more items exactly matching the search criteria.

Items can be matched between users using item names and categories. One item may feature in a first category for a first user and a second category for a second user. In one embodiment, items between two users are matched with preference to one of item name and category. In another embodiment, if a high confidence match for an item is found in a different category, the item is reported under one category. In still another embodiment, the item may be reported under a plurality of categories with optional notes marking the duplicates. In yet another embodiment, for items that have multiple categories, only one category is used for a report. As an example, if a user's item matches with one or more items associated with one or more friends, categories are checked for a match and the category with the highest frequency across all friends is used for the report. In another embodiment, the category may be determined using any other algorithm and/or consideration.

Match scores are determined (step 550) to compute ranking of matching items. The match score used for ranking is based on an outcome of one or more mathematical operations. In one embodiment, a preference intensity (PI) is calculated based on the degree of preference indicated by a user. In another embodiment, the calculation of PI is based on the degree of preference indicated by a user via the rating emoticons 365. As an example, an indication of a strong like, like, dislike and strong dislike may carry scores of 2, 1, −1 and −2, respectively. In still another embodiment, summation of all user preference scores indicates a total PI score for a matching item. In some embodiments, the total PI score indicates whether the overall match is positive or negative. By way of example, if 4 users are matched on an item and there are 2 strong likes, 1 strong dislike and 1 dislike, the total PI score is $2+2+(-2)+(-1)=1$.

In one embodiment, a weighted frequency is calculated as a percentage score based on the balance of positive and negative preferences. In another embodiment, whether a match is positive or negative is determined based on the PI score. In the example discussed above, a positive PI indicates a positive match, a negative PI indicates a negative match and a 0 PI indicates a neutral match. In still another embodiment, a percentage of majority is calculated to determine the match score.

Continuing with the above example, a PI score of 1 indicates a positive match. The weighting factor is calculated as: ((number of positive matches) multiplied by (respective scores)) divided by (sum of absolute value of all scores). In the above example the weighting factor as a percentage is therefore $(2*2/7)*100$ which is approximately 57%. In one embodiment, the matched items may be ranked based on their match scores. Even though determination of match scores is described with respect to the algorithm above, it can be appreciated that the match score may be determined using one or more algorithms, tools, and mathematical, statistical, logical and Boolean operations as apparent to one skilled in the art.

Match scores are compared (step 560) with one another and the results displayed. In one embodiment, the results may be displayed in an ascending or descending order of ranks computed on the basis of match scores. In case of substantially equal ranks for a plurality of items, the plurality of items are displayed in alphabetical order, order of appearance, random order or any other order. In another embodiment, the positive and negative matches are ranked and displayed separately. In still another embodiment, a limited number of results are displayed in accordance with a preference indicated by the user. In yet another embodiment, one or more neutral matches or matches that are neither positive or negative are displayed separately. In other embodiments, neutral matches are not displayed.

Figure 6A:
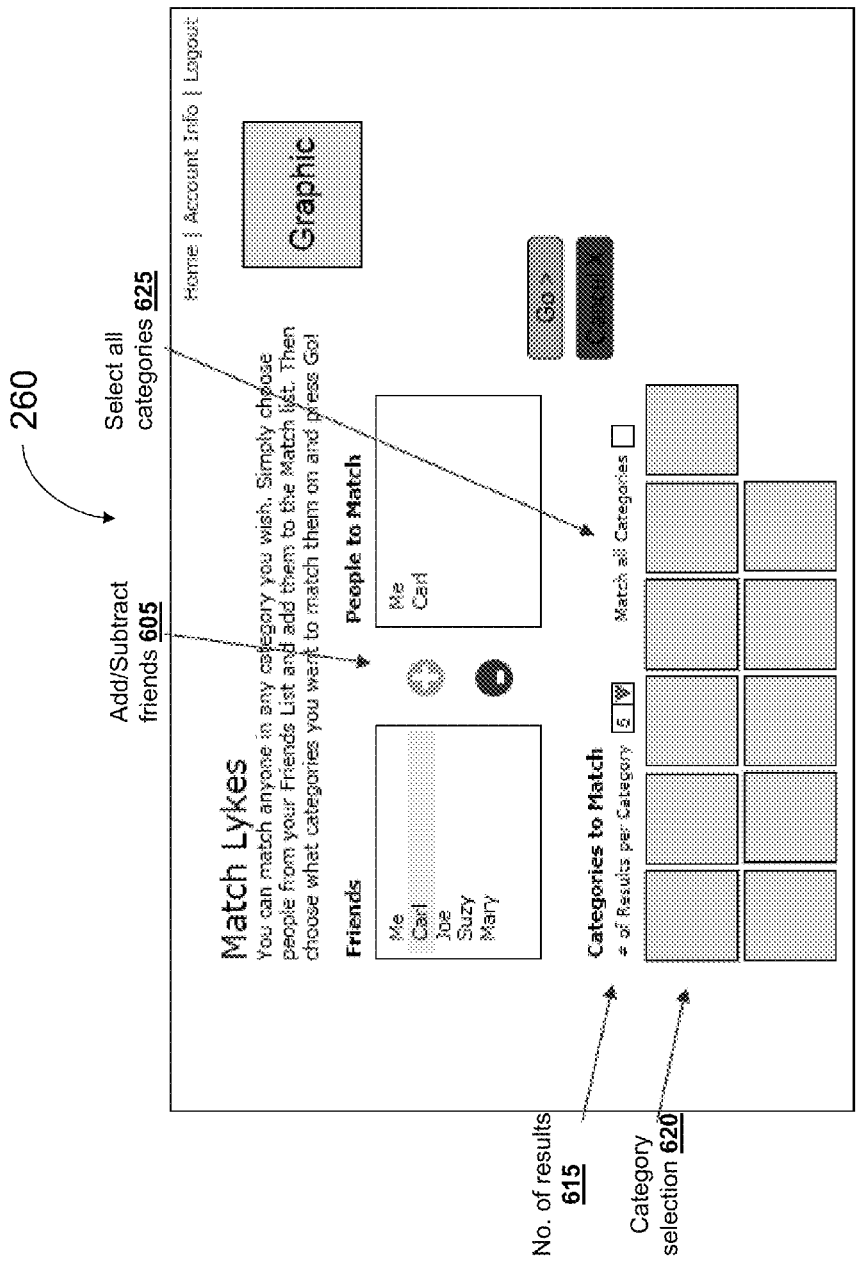

Referring now to FIG. 6A, an example screenshot of a matches webpage 265 for specifying matching criteria is shown and described. In one embodiment, the matches webpage 265 includes interactive buttons to add/subtract friends 605 from a list of friends. In another embodiment, a field in the matches webpage 265 shows a list of friends added to the matching criteria. In still another embodiment, a field allows the user to enter a number of results 615 via a drop down menu or a textbox. In yet another embodiment, one or more categories may be selected using the category selection 620 section of the matches webpage 265. In a further embodiment, all categories may be selected by clicking on a select all categories 625 checkbox provided on the webpage.

Figure 6B:
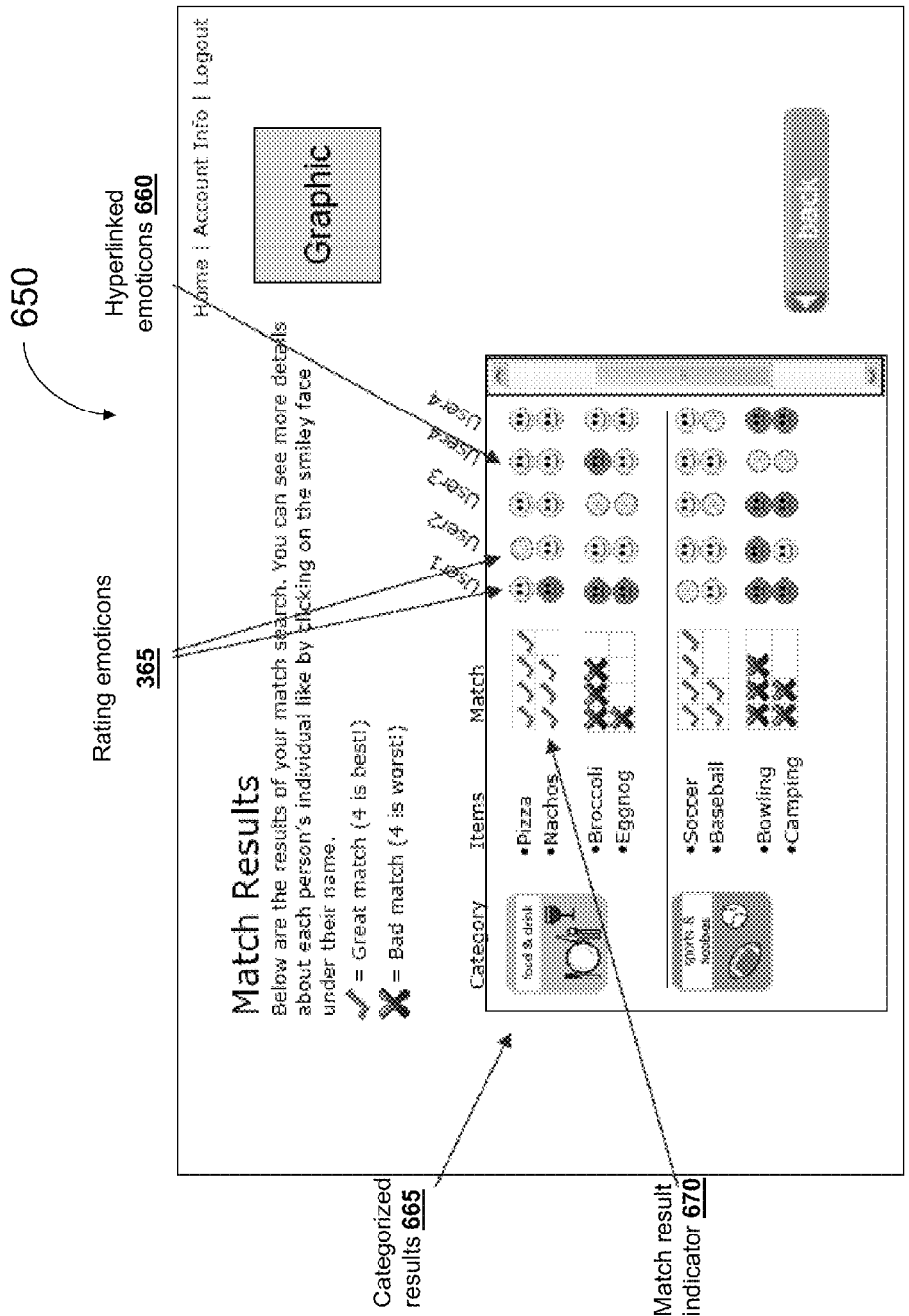

Referring now to FIG. 6B, an example screenshot of a webpage 650 displaying the match results is shown and described. In one embodiment, the result is generated based on the matching and ranking described above. In another embodiment, the webpage 650 displays a list of categorized results 665. In still another embodiment, the categorized results 665 include matching items within each category of one or more categories. In yet another embodiment a number of best matches and a number of worst matches are displayed for each category. In one embodiment, the number of matches to be displayed is determined by a preference indicated by the user. In another embodiment, a default number of matches are shown. In still another embodiment, the categorized results 665 are displayed across a plurality of pages linked to each other. In yet another embodiment, the results are shown on one page with vertical and horizontal scroll bars.

In one embodiment, the categorized results 665 include one or more match result indicators 670. In another embodiment, the match result indicator is a graphical representation of the match score. For example, a positive match score of 75% or more can be represented using 4 tick marks. In the same example, a positive match score of 50%-75%, 25%-50% and 0%-25% are represented by 3, 2 and 1 tick marks, respectively. Negative matches can be represented in a substantially same manner using a different symbol such as a cross. In still another embodiment, any combination and number of symbol, image or graphics can be used to represent the positive and negative matches. In further embodiments, the positive and negative matches may be represented numerically, textually or in any other pictorial and/or graphical form as apparent to one skilled in the art.

Figure 6C:
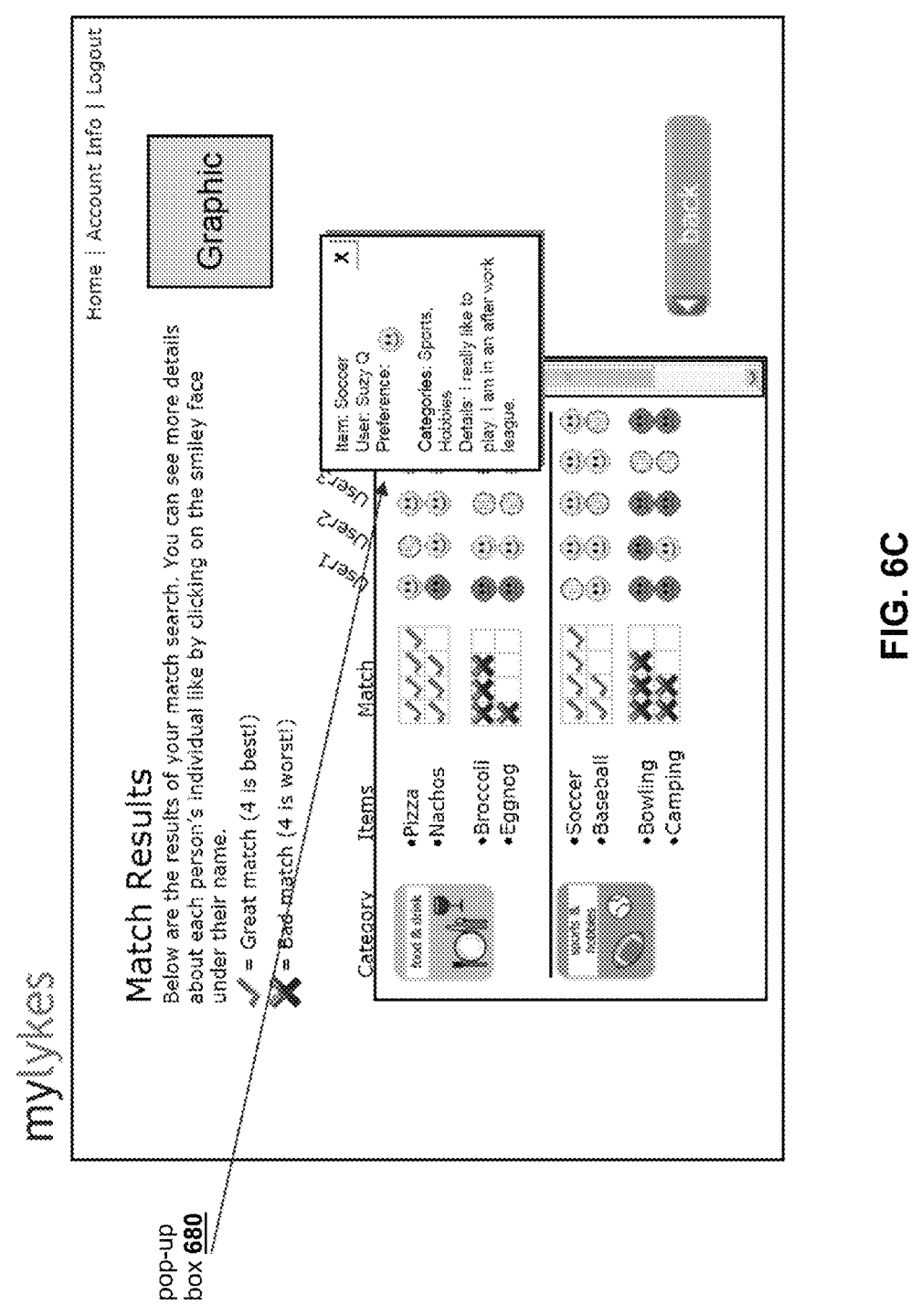

In one embodiment, rating emoticons 365 are used to indicate the degree of preference of a user for a particular item. In another embodiment, appearance of the rating emoticons 365 are based on the ratings derived from the preference indicated by each user in his/her profile. In still another embodiment, a separate appearance and/or color is used for a rating emoticon 365 if a particular user's profile does not indicate a preference for a particular item. In yet another embodiment, one or more of the emoticons are hyperlinked 660. The hyperlinked emoticons 660 provide link to more information on the user's preference for a particular item. In one embodiment, when a mouse pointer is held or clicked on a hyperlinked emoticon 660, a pop-up box 680 as shown in FIG. 6C opens up to provide further information. in some embodiments, the pop-up box 680 may have information including but not limited to name of the item, name of user, preference indicator, category and/or subcategory of the item and any other user entered details. In another embodiment, a hyperlinked emoticon 660 provides a link to one of the user's profile or another page providing the further information.

Still referring to FIG. 6B, interpretation of the match results leads to effectively connecting with a plurality of users and efficient organization of events. In the example shown in FIG. 6B, matching has been conducted between 5 users. The match results indicate that in the category of food and drinks, there is a strong positive match between the users for pizza indicated by 4 tick marks for the item pizza in the match result indicator 670. The rating emoticons 365 indicate that 4 of the 5 users have indicated a strong like for pizza while one user has not indicated any preference. In the example there is a moderately strong negative match (as indicated by 3 crosses in the match result indicator 670) for the item broccoli. In sports and hobbies there is a moderately strong negative match for the item bowling as indicated by 3 cross marks in the match result indicator 670. The rating emoticons 365 for the item reveal that 4 out of 5 users have a dislike for bowling while one user has not indicated a preference. If a user is organizing a party for the 5 users based on these match results, he or she would want to order pizza with a high degree of confidence that most attendees would like it. Based on the results, the user should refrain from ordering any broccoli dish and should not organize the party at a bowling alley.

Figure 7:
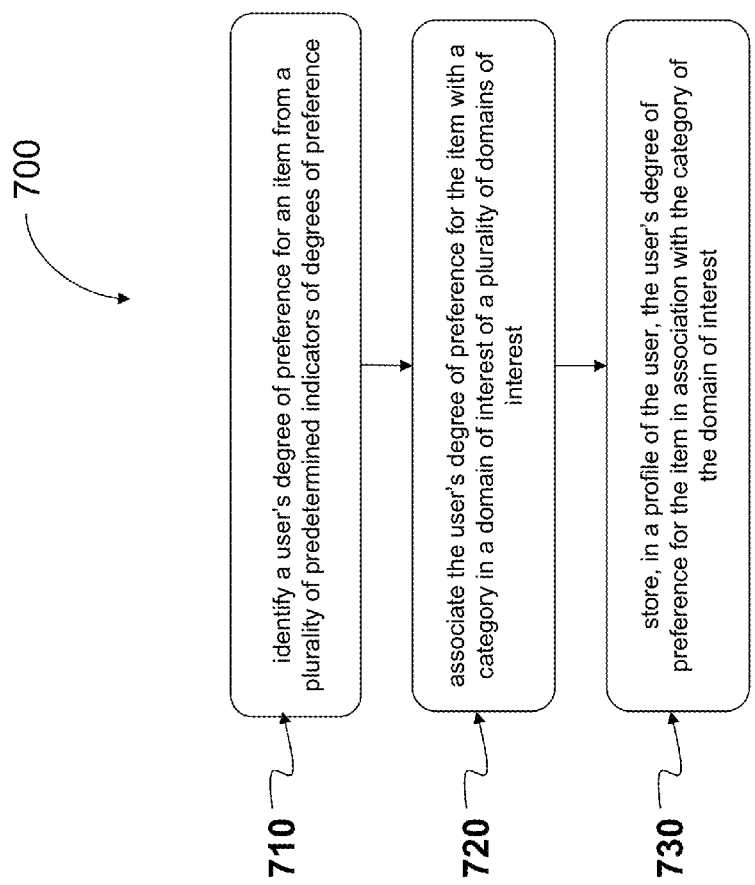
FIG. 7 is a flow diagram depicting steps of an embodiment of a method for centrally providing a profile of a user's degree of preference for one or more items across categories in a plurality of domains of interest in a taxonomy of preferences.

Referring now to FIG. 7, a flow diagram depicting steps of an embodiment of a method for centrally providing a profile of a user's degree of preference for one or more items across categories in a plurality of domains of interest in a taxonomy of preferences is shown and described. In brief overview a users degree of preference for an item is identified (step 710) from a plurality of predetermined indicators of degrees of preference. The user's degree of preference for the item is associated (step 720) with a category in a domain of interest of a plurality of domains of interest and stored (step 730) in a profile of the user in association with the category of the domain of interest.

In one embodiment, identifying (step 710) a user's degree of preference for an item includes identifying a level of like or dislike for the item. In another embodiment, the predetermined indicators of degrees of preference can be the rating emoticons 365 as described with respect to FIG. 3C. In still another embodiment, the indicators can be any numerical, textual or graphical indicator as apparent to one skilled in the art. In other embodiments, the indicators may be implemented using one or more emoticons 365, text boxes, drop down menus, checkboxes, hyperlinks, interactive buttons, multimedia interface and any other interactive content. In some embodiments, the indicators may indicate one or more of the following preferences: a like for the item, a strong like for the item, a dislike of the item, and a strong dislike for the item.

The user's degree of preference for an item is associated (step 720) with a category in a domain of interest. In one embodiment, the domain of interest is chosen from a plurality of predefined domains of interest such as the domains depicted in the taxonomy shown in FIGS. 4A-4F. In another embodiment, the user may add a domain of interest to associate the item. In still another embodiment, the user associates an item manually with a category in a domain of interest. In yet another embodiment, an item is associated with a category using one or more algorithms. In some embodiments, text matching and learning algorithms as described with respect to FIG. 5 may be used to associate an item with a category. In one embodiment, an item may be associated with one category in one domain of interest. In another embodiment, the item may be associated with a plurality of categories in one or more domains of interest.

The user's degree of preference is stored (step 730) in a profile of the user in a plurality of ways. In one embodiment, the degree of preference is linked to one or more categories in one or more domains of interest. In another embodiment, one or more of the stored item and the degree of preference is linked to one or more groups. In still another embodiment, one or more preferences from the user's profile is associated with a group. In some embodiments, the functionality and permissions of a group can be associated with a stored item. In yet another embodiment, one or more attributes of an item are stored and associated with the item. In a further embodiment, the privacy and/or visibility of one or more stored attributes may be associated with one or more groups.

Referring now to FIG. 8, a flow diagram depicting steps of an embodiment of a method for centrally accessing a profile of a user is shown and described. In one embodiment the accessing is based on identifying the user's degree of preference for one or more items across categories in a plurality of domains of interest of a taxonomy of preferences. A request is received (step 810) to identify a user's degree of preference for an item. The user's degree of preference for the item is determined (step 820) via a profile of the user. A predetermined indicator is provided (step 830) in response to the request, the indicator identifying the user's degree of preference for the item The request to identify a user's degree of preference for an item may be received (step 810) in many ways. In one embodiment, a requestor requests identification of the user's degree of preference in response to an invitation sent to the requestor by the user. In another embodiment, the request is sent from the package and send webpage 255 via an email. In still another embodiment, the requestor provides an access code to obtain access to the user's degree of preference for the item. In yet another embodiment, the access code is sent to the requestor via the invitation sent by the user. In further embodiments, the access code is sent to the requestor via any medium of communication. In one embodiment, the received request includes a request to match the user's degree of preference to one or more degrees of preference of one or more users in one or more user profiles.

The user's degree of preference for the item is determined (step 820) via one or more attributes of the profile of the user. In one embodiment, the determination is done based on information provided by the user on the user's degree of preference for the item. In another embodiment, the determination is done based on the user's degree of preference for one or more other items substantially similar to the item. In still another embodiment, the determination is done on the basis of one or more items in the same category. In yet another embodiment, the determination is done on the basis of one or more items in one or more substantially similar category. In further embodiments, one or more algorithms, tools and software such as ones described with reference to FIG. 5 may be used for the determination. In one embodiment, the determination is done responsive to determining that the requestor is authorized to access the profile of the user. In another embodiment, the determination includes determining one or more categories and/or attributes associated with the item. In still another embodiment, the determination includes determining if one or more degrees of preference in profiles of one or more users match the user's preference for the item.

In one embodiment, a predetermined indicator is provided (step 830) in response to the request of the requestor. In another embodiment, the indicator identifies the user's degree of preference for the item. An example of such an indicator is the rating emoticon 365 described with respect to FIG. 3C. In still another embodiment, the indicator is a measure that qualitatively and/or quantitatively represents the user's degree of preference for the item. In one embodiment, the indicator is an emoticon or any other graphical representation. In another embodiment, the indicator is a numerical quantity derived from one or more attributes of the item using one or more mathematical, logical, statistical or Boolean operations. In still another embodiment, the indicator is a textual description of the user's like or dislike for the item. In a further embodiment, providing the predetermined indicator is accompanied by providing one or more categories associated with the item.

The system and methods described herein allows a user to connect with other users and individuals more effectively. Information on the likes and dislikes of other individuals also help in more efficient organization of events. As an example, if a user is organizing a party, the user can look into the profiles of the invitees to ensure that a food item that is disliked by a majority of invitees is not ordered. The user can also run the smart matcher to determine a combination of food and drinks items that will be preferred by the invitees. The services described herein can also be used in corporate environments. A secretary who is organizing a lunch for a plurality of attendees, can look into the profiles of the attendees and order their preferred lunch menu without consulting with them. When booking an airline ticket on a person's behalf, the person's preference of airline, window vs. aisle seat, meal restrictions and other requirements can be found out without a conversation. The services described herein may also be consulted in buying gifts or presents for an individual. The profile of the individual may have a wishlist that may have a list of items that the individual wishes to receive as a gift. In the absence of a wishlist, the profile of the user may be looked up to determine an appropriate gift based on his likes and dislikes. The services described herein are particularly helpful in organizing an event for a plurality of individuals with varying likes and dislikes. When organizing events such as a sporting event or a musical event involving the plurality of individuals, the services described herein can be used to make the event likeable for all individuals involved.

In view of the structure and functions of the systems and methods described herein, the present solution provides a dynamic, efficient and intelligent web based services for querying and matching likes and dislikes of one or more individuals. Having described certain embodiments of methods and systems for such a web based service, it will now become apparent to one of skill in the art that other embodiments incorporating the concepts of the invention may be used. Therefore, the invention should not be limited to certain embodiments, but rather should be limited only by the spirit and scope of the following claims:

What is claimed:

1. A method for centrally providing a profile of a user's degree of preference for one or more items across categories in a plurality of domains of interest in a taxonomy of preferences, the method comprising:
   (a) receiving, via a server from one or more users, identification of a user's degree of preference for an item from a plurality of predetermined indicators of degrees of preference and identification of one of a category or a domain of interest created by one of the one or more users;
   (b) associating, via the server, the user's degree of preference for the item with the category in the domain of interest of a plurality of domains of interest, the server dynamically adding one of the domain of interest or the category to a taxonomy of preferences; and
   (c) storing, by the server in a profile of the user, the user's degree of preference for the item in association with the category of the domain of interest, the profile identifying preferences of the user in the taxonomy of preferences across categories in the plurality of domains of interest.

2. The method of claim 1, wherein step (a) further comprising receiving, by the server, identification by the user, the user's degree of like or dislike for the item.

3. The method of claim 1, wherein step (a) further comprising receiving, by the server from a device of a second user different than the user, identification by the second user, the user's degree of preference for the item and one of the category or the domain of interest.

4. The method of claim 1, wherein step (a) further comprises providing an emoticon for each of the plurality of predetermined indicators of degrees of preference, the emoticon representing one of a degree of like or dislike.

5. The method of claim 1, wherein step (a) further comprises providing the plurality of predetermined indicators of degrees of preference to indicate one or more of the following preferences: a like for the item, a strong like for the item, a dislike for the item, and a strong dislike for the item.

6. The method of claim 1, wherein step (b) comprises associating the user's degree of preference for the item with a plurality of categories in different domains of interest in the taxonomy.

7. The method of claim 1, further comprising the server identifying by the taxonomy of preferences in the profile of the user the user's preference for a plurality of items associated with a hierarchy of categories in each domain of interest.

8. The method of claim 1, wherein the plurality of domains of interest comprise one or more of the following: food and drink, entertainment, love and relationships, fashion and style, news and gossip, travel, sports, fitness and wellness, and inner me.

9. The method of claim 1, comprising creating, by the server, a group and selecting one or more preferences from the user's profile to associate with the group.

10. The method of claim 1, wherein step (a) further comprises providing a textual description of the user's degree of preference for the item.

11. A system for centrally providing a profile of a user's degree of preference for one or more items across categories in a plurality of domains of interest in a taxonomy of preferences, the system comprising:
a server configured to receive from one or more users identification of a user's degree of preference for an item from a plurality of predetermined indicators of degrees of preference and identification of one of a category or a domain of interest created by one of the one or more users and associate the user's degree of preference for the item with the category in the domain of interest of a plurality of domains of interest the server configured to dynamically add one of the domain of interest or the category to a taxonomy of preferences; and
wherein the server is configured to store in a profile of the user, the user's degree of preference for the item in association with the category of the domain of interest, and
wherein the profile identifies preferences of the user in the taxonomy of preferences across categories in the plurality of domains of interest.

12. The system of claim 11, wherein the server is further configured to receive from the user identification of the user's degree of like or dislike for the item.

13. The system of claim 11, wherein the server is further configured to receive from a device of a second user the second user's identification of the user's degree of preference for the item and one of the category or the domain of interest.

14. The system of claim 11, wherein the server is further configured to provide an emoticon for each of the plurality of predetermined indicators of degrees of preference, the emoticon representing one of a degree of like or dislike.

15. The system of claim 11, wherein the server is further configured to provide the plurality of predetermined indicators of degrees of preference to indicate one or more of the following preferences: a like for the item, a strong like for the item, a dislike for the item, and a strong dislike for the item.

16. The system of claim 11, wherein the server is further configured to associate the user's degree of preference for the item with a plurality of categories in different domains of interest in the taxonomy.

17. The system of claim 11, wherein the server is further configured to identify by the taxonomy of preferences in the profile of the user the user's preference for a plurality of items associated with a hierarchy of categories in each domain of interest.

18. The system of claim 11, wherein the plurality of domains of interest comprise one or more of the following: food and drink, entertainment, love and relationships, fashion and style, news and gossip, travel, sports, fitness and wellness, and inner me.

19. The system of claim 11, wherein the server is further configured to create a group and select one or more preferences from the user's profile to associate with the group.

20. The system of claim 11, wherein the server is further configured to provide a textual description of the user's degree of preference for the item.

* * * * *